(12) United States Patent
Hattori et al.

(10) Patent No.: US 11,524,481 B2
(45) Date of Patent: *Dec. 13, 2022

(54) LOW REFRACTIVE INDEX LAYER, LAMINATED FILM, METHOD FOR PRODUCING LOW REFRACTIVE INDEX LAYER, METHOD FOR PRODUCING LAMINATED FILM, OPTICAL ELEMENT, AND IMAGE DISPLAY DEVICE

(71) Applicant: NITTO DENKO CORPORATION, Ibaraki (JP)

(72) Inventors: Daisuke Hattori, Ibaraki (JP); Kazuhito Hosokawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/758,073

(22) PCT Filed: Sep. 6, 2016

(86) PCT No.: PCT/JP2016/076217
§ 371 (c)(1),
(2) Date: Mar. 7, 2018

(87) PCT Pub. No.: WO2017/043496
PCT Pub. Date: Mar. 16, 2017

(65) Prior Publication Data
US 2018/0215124 A1    Aug. 2, 2018

(30) Foreign Application Priority Data

Sep. 7, 2015  (JP) .............................. JP2015-176211
Sep. 3, 2016  (JP) ................................ 2016-172343

(51) Int. Cl.
   *B32B 5/18*       (2006.01)
   *G02B 1/118*      (2015.01)
   (Continued)

(52) U.S. Cl.
   CPC .................. *B32B 5/18* (2013.01); *B32B 7/14* (2013.01); *B32B 27/20* (2013.01); *G02B 1/111* (2013.01);
   (Continued)

(58) Field of Classification Search
   CPC .... B32B 5/18; B32B 7/02; B32B 7/14; G02B 1/111; G02B 1/118; G02B 1/14
   See application file for complete search history.

(56) References Cited

U.S. PATENT DOCUMENTS 2,870,109 A    1/1959  Nickerson
4,408,009 A   10/1983  Mallon
(Continued)

FOREIGN PATENT DOCUMENTS

CN    1032503 A   4/1989
CN    1221629 A   7/1999
(Continued)

OTHER PUBLICATIONS

Translation of JP 2005-148623. See IDS filed Mar. 7, 2018 for inventor and date.*
(Continued)

*Primary Examiner* — Hai Vo
(74) *Attorney, Agent, or Firm* — WHDA, LLP

(57) ABSTRACT

The present invention aims to provide a low refractive index layer that can attain both a low refractive index and a high mechanical strength even when it has a large thickness. The low refractive index layer of the present invention is a low refractive index layer in the form of a void-containing layer, wherein hollow particles each having a void space inside are
(Continued)

further contained in the void-containing layer, and the low refractive index layer has a refractive index of 1.25 or less.

17 Claims, 8 Drawing Sheets

(51) Int. Cl.
  *B32B 7/14* (2006.01)
  *B32B 27/20* (2006.01)
  *G02B 1/111* (2015.01)
  *G02B 1/14* (2015.01)

(52) U.S. Cl.
  CPC ...... *G02B 1/118* (2013.01); *B32B 2266/0214* (2013.01); *G02B 1/14* (2015.01)

(56) References Cited

U.S. PATENT DOCUMENTS

| | | | |
|---|---|---|---|
| 5,124,188 A | 6/1992 | Roe et al. | |
| 5,676,938 A | 10/1997 | Kimura et al. | |
| 5,844,060 A | 12/1998 | Furuya et al. | |
| 5,948,314 A | 9/1999 | Geiss et al. | |
| 5,948,482 A | 9/1999 | Brinker et al. | |
| 6,251,523 B1 | 6/2001 | Takahashi et al. | |
| 6,265,516 B1 | 7/2001 | Okawa et al. | |
| 6,300,385 B1 | 10/2001 | Hashida et al. | |
| 7,960,029 B2 | 6/2011 | Kai et al. | |
| 8,124,224 B2 | 2/2012 | Kato et al. | |
| 8,488,082 B2 | 7/2013 | Nishiguchi et al. | |
| 10,472,483 B2* | 11/2019 | Haruta | C08J 9/28 |
| 2001/0003358 A1 | 6/2001 | Terase et al. | |
| 2003/0023021 A1 | 1/2003 | Sakuma | |
| 2003/0134124 A1 | 7/2003 | Ochiai | |
| 2004/0114248 A1 | 6/2004 | Hokazono et al. | |
| 2004/0132846 A1 | 7/2004 | Leventis et al. | |
| 2004/0216641 A1 | 11/2004 | Hamada et al. | |
| 2004/0253427 A1* | 12/2004 | Yokogawa | G02B 5/0278 428/212 |
| 2005/0038137 A1 | 2/2005 | Yoshihara et al. | |
| 2005/0162743 A1 | 7/2005 | Yano et al. | |
| 2005/0165197 A1 | 7/2005 | Ogihara et al. | |
| 2005/0195486 A1 | 9/2005 | Sasaki et al. | |
| 2006/0093786 A1 | 5/2006 | Ohashi et al. | |
| 2006/0164740 A1 | 7/2006 | Sone et al. | |
| 2006/0239886 A1 | 10/2006 | Nakayama et al. | |
| 2006/0269724 A1 | 11/2006 | Ohashi et al. | |
| 2006/0269733 A1 | 11/2006 | Mizuno et al. | |
| 2006/0281828 A1 | 12/2006 | Nakayama et al. | |
| 2007/0196667 A1 | 8/2007 | Asai | |
| 2007/0206283 A1 | 9/2007 | Ohtani et al. | |
| 2007/0248828 A1 | 10/2007 | Yoneyama et al. | |
| 2008/0075895 A1 | 3/2008 | Yamaki et al. | |
| 2008/0171188 A1 | 7/2008 | Van Baak et al. | |
| 2008/0290472 A1 | 11/2008 | Yagihashi et al. | |
| 2008/0311398 A1 | 12/2008 | Bauer et al. | |
| 2008/0316602 A1 | 12/2008 | Kameshima et al. | |
| 2009/0202802 A1 | 8/2009 | Seong et al. | |
| 2009/0244709 A1 | 10/2009 | Suzuki et al. | |
| 2010/0102251 A1 | 4/2010 | Ferrini et al. | |
| 2010/0160577 A1 | 6/2010 | Hirano | |
| 2010/0246014 A1 | 9/2010 | Asahi et al. | |
| 2010/0256321 A1 | 10/2010 | Kim et al. | |
| 2011/0033398 A1 | 2/2011 | Cauvin et al. | |
| 2011/0195239 A1 | 8/2011 | Takane et al. | |
| 2011/0224308 A1 | 9/2011 | Saito et al. | |
| 2012/0038990 A1 | 2/2012 | Hao et al. | |
| 2013/0202867 A1 | 8/2013 | Coggio et al. | |
| 2013/0265477 A1 | 10/2013 | Furusato et al. | |
| 2013/0337161 A1 | 12/2013 | Akimoto et al. | |
| 2014/0009835 A1 | 1/2014 | Shibuya et al. | |
| 2014/0371317 A1 | 12/2014 | Aliyar et al. | |
| 2015/0037535 A1 | 2/2015 | Akimoto et al. | |
| 2015/0037605 A1 | 2/2015 | Oser et al. | |
| 2015/0166353 A1 | 6/2015 | Kobayashi et al. | |
| 2016/0025899 A1 | 1/2016 | Ishizeki et al. | |
| 2016/0131819 A1* | 5/2016 | Musashi | B32B 3/26 428/313.3 |
| 2016/0170094 A1* | 6/2016 | Nakayama | G02B 1/11 428/149 |
| 2016/0194451 A1 | 7/2016 | Yoshida et al. | |
| 2016/0304722 A1* | 10/2016 | Kobori | C09D 7/67 |
| 2017/0183542 A1 | 6/2017 | Kato et al. | |
| 2017/0341336 A1* | 11/2017 | Haruta | C08J 7/046 |
| 2017/0342232 A1 | 11/2017 | Haruta et al. | |
| 2018/0002508 A1* | 1/2018 | Hattori | C08J 9/28 |
| 2018/0215124 A1 | 8/2018 | Hattori et al. | |
| 2018/0223061 A1 | 8/2018 | Hattori et al. | |
| 2018/0224580 A1* | 8/2018 | Hattori | G06F 3/00 |

FOREIGN PATENT DOCUMENTS

| | | |
|---|---|---|
| CN | 1256381 A | 6/2000 |
| CN | 1275589 A | 12/2000 |
| CN | 1544324 A | 11/2004 |
| CN | 1646947 A | 7/2005 |
| CN | 1809764 A | 7/2006 |
| CN | 1842727 A | 10/2006 |
| CN | 101007911 A | 8/2007 |
| CN | 101128752 A | 2/2008 |
| CN | 101792529 A | 8/2010 |
| CN | 102186668 A | 9/2011 |
| CN | 102460244 A | 5/2012 |
| CN | 102712140 A | 10/2012 |
| CN | 102736135 A | 10/2012 |
| CN | 103168257 A | 6/2013 |
| CN | 103185905 A | 7/2013 |
| CN | 103213996 A | 7/2013 |
| CN | 103660513 A | 3/2014 |
| CN | 103738971 A | 4/2014 |
| EP | 1031612 A2 | 8/2000 |
| EP | 3235638 A1 | 10/2017 |
| EP | 3239221 A1 | 11/2017 |
| EP | 3239257 A1 | 11/2017 |
| EP | 3246355 A1 | 11/2017 |
| JP | 61-250032 A | 11/1986 |
| JP | 5-506681 A | 9/1993 |
| JP | H07-48527 A | 2/1995 |
| JP | H07-133105 A | 5/1995 |
| JP | 9-24575 A | 1/1997 |
| JP | H10-508049 A | 8/1998 |
| JP | H11-292568 A | 10/1999 |
| JP | 2000-119433 A | 4/2000 |
| JP | 2000-256040 A | 9/2000 |
| JP | 2000-264620 A | 9/2000 |
| JP | 2000-284102 A | 10/2000 |
| JP | 2001-163613 A | 6/2001 |
| JP | 2002-311204 A | 10/2002 |
| JP | 2003-216061 A | 7/2003 |
| JP | 2004-10424 A | 1/2004 |
| JP | 2004-300172 A | 10/2004 |
| JP | 2004-323752 A | 11/2004 |
| JP | 2004-354699 A | 12/2004 |
| JP | 2005-148623 A | 6/2005 |
| JP | 2005-164195 A | 6/2005 |
| JP | 2005-350519 A | 12/2005 |
| JP | 2006-11175 A | 1/2006 |
| JP | 2006-96019 A | 4/2006 |
| JP | 2006-96967 A | 4/2006 |
| JP | 2006-221144 A | 8/2006 |
| JP | 2006-255496 A | 9/2006 |
| JP | 2006-297329 A | 11/2006 |
| JP | 2007-014946 A | 1/2007 |
| JP | 2008-40171 A | 2/2008 |
| JP | 2008-205008 A | 9/2008 |
| JP | 2008-214569 A | 9/2008 |
| JP | 2008-291074 A | 12/2008 |
| JP | 2009-503226 A | 1/2009 |
| JP | 2009-258711 A | 11/2009 |
| JP | 2010-256880 A | 11/2010 |
| JP | 2012-91943 A | 5/2012 |
| JP | 2012-189802 A | 10/2012 |
| JP | 2012-524299 A | 10/2012 |
| JP | 2012-228878 A | 11/2012 |

(56) References Cited

FOREIGN PATENT DOCUMENTS

| | | | |
|---|---|---|---|
| JP | 2013007831 A * | 1/2013 | |
| JP | 2013-60309 A | 4/2013 | |
| JP | 2013-083722 A | 5/2013 | |
| JP | 2014-046518 A | 3/2014 | |
| JP | 2014-122309 A | 7/2014 | |
| JP | 2015-028540 A | 2/2015 | |
| JP | 2015-064607 A | 4/2015 | |
| JP | 2016-104551 A | 6/2016 | |
| KR | 10-2003-0040065 A | 5/2003 | |
| KR | 10-2004-0044532 A | 5/2004 | |
| KR | 10-2007-0011303 A | 1/2007 | |
| KR | 10-2007-0022059 A | 2/2007 | |
| KR | 10-2009-0006784 A | 1/2009 | |
| TW | 213860 B | 10/1993 | |
| TW | 200300157 A | 5/2003 | |
| TW | 200844194 A | 11/2008 | |
| TW | 201447389 A | 12/2014 | |
| TW | 201447402 A | 12/2014 | |
| WO | 2010/120845 A2 | 10/2010 | |
| WO | 2010/120971 A1 | 10/2010 | |
| WO | 2011/088161 A1 | 7/2011 | |
| WO | 2012/115057 A1 | 8/2012 | |
| WO | 2012/124693 A1 | 9/2012 | |
| WO | 2014/034588 A1 | 3/2014 | |
| WO | 2014/175124 A1 | 10/2014 | |
| WO | 2015/041257 A1 | 3/2015 | |
| WO | 2016/104762 A1 | 6/2016 | |

OTHER PUBLICATIONS

Translation of JP 2006-096019. See IDS filed Mar. 7, 2018 for inventor and date.*
Translation of JP 2013 007831, Kawamura et al., Jan. 10, 2013. (Year: 2013).*
Yildirim et al., "Template free preparation of nanoporous organically modified silica thin films on flexible substrates", Journal of Materials Chemistry, (2011), vol. 21, pp. 14830-14837, (8 pages).
International Seach Report dated Dec. 13, 2016, issued in counterpart International Application No. PCT/JP2016/076217 (1 page).
Office Action dated May 8, 2019, issued in counterpart CN Application No. 201680051845.0, with partial English translation. (12 pages).
Office Action dated Nov. 12, 2019, issued in counterpart TW Application No. 105128742, with English translation (16 pages).
Office Action dated Apr. 7, 2020, issued in counterpart JP application No. 2016-172343, with English translation. (4 pages).
Office Action dated May 25, 2020, issued in counterpart KR Application No. 10-2018-7008684, with Partial translation. (15 pages).
Office Action dated Oct. 20, 2020, issued in counterpart JP Application No. 2016-172343, with English Translation. (5 pages).
Office Action dated Mar. 26, 2021, issued in counterpart KR Application No. 10-2018-7008684, with partial English translation (16 pages).
Office Action dated Apr. 13, 2021, issued in counterpart JP Application No. 2016-172343, with English Translation. (4 pages).
Search Report dated May 31, 2019, issued in CN application No. 2016800376799 (counterpart to U.S. Appl. No. 15/749,148). (1 pages).
Restriction/Election Requirement dated Apr. 19, 2018, issued in U.S. Appl. No. 15/539,926. (10 pages).
Non-Final Office Action dated May 27, 2021, issued in U.S. Appl. No. 15/539,928. (16 pages).
Office Action dated Sep. 6, 2021, issued in KR application No. 10-2017-7035012 (counterpart to U.S. Appl. No. 15/749,148), with English translation. (3 pages).
Office Action dated Sep. 29, 2020, issued in JP application No. 2016-149062 (counterpart to U.S. Appl. No. 15/754,406), with English translation. (8 pages).
Office Action dated Oct. 31, 2018, issued in counterpart Chinese application No. 201580071024.9, with English translation. (11 pages).
Office Action dated Oct. 18, 2021, issued in KR application No. 10-2017-7034375 (counterpart to U.S. Appl. No. 15/754,406), with English translation. (11 pages).
Office Action dated Nov. 6, 2019, issued in CN application No. 201580071036.1 (counterpart to U.S. Appl. No. 15/539,926), with English translation. (13 pages).
Office Action dated Nov. 6, 2019, issued in CN application No. 201580071018.3 (counterpart to U.S. Appl. No. 15/539,946), with English translation. (13 pages).
Office Action dated Nov. 24, 2020, issued in KR Application No. 10-2017-7035012 (counterpart to U.S. Appl. No. 15/749,148), with English translation. (12 pages).
Office Action dated Nov. 2, 2020, issued in KR Application No. 10-2017-7035011 (counterpart to U.S. Appl. No. 15/749,250), with English translation. (15 pages).
Office Action dated Nov. 19, 2020, issued in EP Application No. 16 832 970.4 (counterpart to U.S. Appl. No. 15/749,148). (5 pages).
Office Action dated May 31, 2019, issued in CN application No. 201680037679.9 (counterpart to U.S. Appl. No. 15/749,148), with English translation. (10 pages).
Office Action dated May 18, 2020, issued in CN application No. 201580071024.9 (counterpart to U.S. Appl. No. 16/503,009), with English translation. (27 pages).
Office Action dated Mar. 2, 2020, issued in EP application No. 15873333.7 (counterpart to U.S. Appl. No. 15/539,927). (4 pages).
Office Action dated Mar. 16, 2020, issued in CN application No. 201680037679.9 (counterpart to U.S. Appl. No. 15/749,148), with English translation. (13 pages).
Office Action dated Jun. 30, 2021, issued in CN Application No. 201680037716.6 (counterpart to U.S. Appl. No. 15/749,250), with English Translation. (11 pages).
Office Action dated Jun. 3, 2021, issued in CN application No. 202010325596.8 (counterpart to U.S. Appl. No. 15/539,927), with English translation. (13 pages).
Office Action dated Jun. 28, 2019, issued in CN application No. 201580071024.9 (counterpart to U.S. Appl. No. 15/539,928), with partial machine translation. (12 pages).
Office Action dated Jun. 26, 2019, issued in TW application No. 104143838 (counterpart to U.S. Appl. No. 15/539,946), with partial English translation. (15 pages).
Office Action dated Jun. 13, 2019, issued in JP application No. 2015-176204 (counterpart to U.S. Appl. No. 15/539,926), with partial English translation. (5 pages).
Office Action dated Jun. 11, 2020, issued in CN application No. 201680043414.X (counterpart to U.S. Appl. No. 15/754,406), with English translation. (13 pages).
Office Action dated Jun. 11, 2019, issued in JP application No. 2015-176205 (counterpart to U.S. Appl. No. 15/539,946), with partial English translation. (5 pages).
Office Action dated Jul. 31, 2020, issued in CN application No. 201580071036.1 (counterpart to U.S. Appl. No. 16/503,009), with English translation. (17 pages).
Office Action dated Jul. 22, 2019, issued in TW application No. 104143840 (counterpart to U.S. Appl. No. 15/539,928), with English translation. (13 pages).
Office Action dated Jul. 2, 2019, issued in TW application No. 104143841 (counterpart to U.S. Appl. No. 15/539,926), with partial English translation. (11 pages).
Office Action dated Jul. 1, 2019, issued in CN application No. 201680043414.X (counterpart to U.S. Appl. No. 15/754,406), with partial machine translation. (15 pages).
Office Action dated Jan. 7, 2020, issued in JP application No. 2016-149061 (counterpart to U.S. Appl. No. 15/749,148), with English translation. (12 pages).
Office Action dated Jan. 7, 2020, issued in JP application No. 2016-149060 (counterpart to U.S. Appl. No. 15/749,250), with English translation. (12 pages).
Office Action dated Jan. 5, 2021, issued in JP Application No. 2019-198274 (counterpart to U.S. Appl. No. 16/503,009), with English translation. (10 pages).

(56) References Cited

OTHER PUBLICATIONS

Office Action dated Feb. 7, 2019, issued in EP application No. 15873333.7(counterpart to U.S. Appl. No. 15/539,927)(4 pages).
Office Action dated Feb. 5, 2020, issued in TW application No. 105124139 (counterpart to U.S. Appl. No. 15/749,148), with partial English translation. (15 pages).
Office Action dated Feb. 4, 2020, issued in TW application No. 105125188 (counterpart to U.S. Appl. No. 15/754,406), with partial English translation. (12 pages).
Office Action dated Feb. 4, 2020, issued in TW application No. 105124140 (counterpart to U.S. Appl. No. 15/749,250), with partial English translation. (21 pages).
Office Action dated Feb. 27, 2019, issued in CN application No. 201580071004.1 (counterpart to U.S. Appl. No. 15/539,927), with partial English translation. (12 pages).
Office Action dated Feb. 2, 2021, issued in counterpart CN Application No. 201580071024.9. with English translation (11 pages). (counterpart to U.S. Appl. No. 15/539,926).
Office Action dated Dec. 24, 2019, issued in JP application No. 2016-149062 (counterpart to U.S. Appl. No. 15/754,406), with English translation. (6 pages).
Office Action dated Dec. 2, 2020, issued in KR Application No. 10-2017-7034375 (counterpart to U.S. Appl. No. 15/754,406), with English translation. (11 pages).
Office Action dated Aug. 6, 2019, issued in JP application No. 2019-133188 (counterpart to U.S. Appl. No. 15/539,946), with partial English translation. (7 pages).
Office Action dated Aug. 5, 2020, issued in counterpart CN application No. 201580071018.3 (counterpart to U.S. Appl. No. 15/539,946), with English translation. (18 pages).
Office Action dated Aug. 26, 2019, issued in EP application No. 15873333.7 (counterpart to U.S. Appl. No. 15/539,927). (3 pages).
Office Action dated Aug. 21, 2019, issued in TW application No. 104143837 (counterpart to U.S. Appl. No. 15/539,927), with partial English translation. (10 pages).
Office Action dated Aug. 19, 2021, issued in CN Application No. 201580071024.9 (counterpart to U.S. Appl. No. 15/539,928), with English translation. (17 pages).
Office Action dated Aug. 13, 2020, issued in TW application No. 105124139 (counterpart to U.S. Appl. No. 15/749,148), with partial English translation. (17 pages).
Notice of Allowance dated May 20, 2020, issued in U.S. Appl. No. 16/503,009. (11 pages).
Notice of Allowance dated Mar. 28, 2019, issued in U.S. Appl. No. 15/539,927 (9 pages).
Non-Final Office Action dated Sep. 16, 2020, issued in U.S. Appl. No. 15/539,928. (10 pages).
Notice of Allowance dated Apr. 26, 2019, issued in U.S. Appl. No. 15/539,926 (9 pages).
Office Action dated Jan. 5, 2022, issued in JP application No. 2020-219354 (counterpart to U.S. Appl. No. 15/754,406), with English translation. (6 pages).
Final Office Action dated Feb. 2, 2022, issued in U.S. Appl. No. 15/539,928. (48 pages).
Final Office Action dated Jan. 24, 2022, issued in U.S. Appl. No. 15/754,406. (41 pages).
Final Office Action dated Jan. 21, 2022, issued in U.S. Appl. No. 15/539,946. (28 pages).
Office Action dated Jan. 28, 2022, issued in EP application No. 16839019.3 (counterpart to U.S. Appl. No. 15/754,406). (5 pages).
Office Action dated Feb. 8, 2022, issued in EP application No. 15873330.3 (counterpart to U.S. Appl. No. 15/539,926). (7 pages).
Non-Final Office Action dated May 13, 2021, issued in U.S. Appl. No. 15/754,406. (15 pages).
Non-Final Office Action dated Mar. 18, 2020, issued in U.S. Appl. No. 15/754,406. (9 pages).
Non-Final Office Action dated Jun. 18, 2018, issued in U.S. Appl. No. 15/539,926. (17 pages).
Non-Final Office Action dated Jul. 10, 2019, issued in U.S. Appl. No. 15/539,928 (9 pages).
Non-Final Office Action dated Jan. 24, 2020, issued in U.S. Appl. No. 15/539,946. (9 pages).
Non-Final Office Action dated Feb. 3, 2021, issued in U.S. Appl. No. 15/749,148 (13 pages).
Extended (Supplementary) European Search Report dated Jun. 14, 2018, issued in EP Application No. 15873333.7 (counterpart to U.S. Appl. No. 15/539,927). (9 pages).
Extended (Supplementary) European Search Report dated Aug. 13, 2018, issued in EP Application No. 15873332.9 (counterpart to U.S. Appl. No. 15/539,928). (9 pages).
Non-Final Action dated Sep. 9, 2021, issued in U.S. Appl. No. 15/749,250. (15 pages).
Markus Börner et al., "Cross-Linked Monolithic Xerogels Based on Silica Nanoparticles", Chemistry of Materials, 2013, pp. 3648-3653. (6 pages).
Kim, Ho-Cheol et al., "Photopatterned Nanoporous Media", Nano Letters, the American Chemical Society, vol. 4, No. 7, 2004; Cited in Non-Final Office Action dated Feb. 3, 2021.
International Search Report dated Nov. 8, 2016, issued in International Application No. PCT/JP2016/072452 (counterpart of U.S. Appl. No. 15/754,406). (2 pages).
International Search Report dated Nov. 8, 2016, issued in International Application No. PCT/JP2016/072417 (counterpart of U.S. Appl. No. 15/749,250). (2 pages).
International Search Report dated Nov. 8, 2016, issued in counterpart International Application No. PCT/JP2016/072418(counterpart of U.S. Appl. No. 15/749,148). (3 pages).
International Search Report dated Mar. 8, 2016, issued in International Application No. PCT/JP2015/086363 (counterpart of U.S. Appl. No. 15/539,946). (2 pages).
International Search Report dated Mar. 8, 2016, issued in International Application No. PCT/JP2015/086362 (counterpart of U.S. Appl. No. 15/539,926). (2 pages).
International Search Report dated Mar. 29, 2016, issued in International Application No. PCT/JP2015/086365 (counterpart of U.S. Appl. No. 15/539,927). (2 pages).
International Search Report dated Apr. 12, 2016, issued in International Application No. PCT/JP2015/086364 (counterpart of U.S. Appl. No. 15/539,928). (1 page).
International Preliminary Report on Patentability (Form PCT/IB/373) dated Jun. 27, 2017 of International Application No. PCT/JP2015/086365(counterpart of U.S. Appl. No. 15/539,927), with Form PCT/ISA/237. (8 pages).
International Preliminary Report on Patentability (Form PCT/IB/373) dated Jun. 27, 2017 of International Application No. PCT/JP2015/086364(counterpart of U.S. Appl. No. 15/539,928), with Form PCT/ISA/237. (11 pages).
International Preliminary Report on Patentability (Form PCT/IB/373) dated Jun. 27, 2017 of International Application No. PCT/JP2015/086363(counterpart of U.S. Appl. No. 15/539,946), with Form PCT/ISA/237. (10 pages).
International Preliminary Report on Patentability (Form PCT/IB/373) dated Jun. 27, 2017 of International Application No. PCT/JP2015/086362(counterpart of U.S. Appl. No. 15/539,926), with Form PCT/ISA/237. (8pages).
International Preliminary Report on Patentability (Form PCT/IB/373) dated Feb. 6, 2018 of International Application No. PCT/JP2016/072417(counterpartof U.S. Appl. No. 15/749,250), with Form PCT/ISA/237. (22 pages).
International Preliminary Report on Patentability (Form PCT/IB/373) dated Feb. 6, 2018 of International Application No. PCT/JP2016/072418(counterpart of U.S. Appl. No. 15/749,148), with Form PCT/ISA/237. (19 pages).
Horiba Scientific, "Particle Size Result Interpretation: Number vs. Volume Distributions", website entry: url http://www.horiba.com/scientific/products/particle-characterization/education/general-information/data-interpretation/number-vs-volume-distributions/, cited in Notice of Allowance dated Mar. 28, 2019. (4 pages).
Non-Final Office Action dated Jul. 27, 2018, issued in U.S. Appl. No. 15/539,927. (11 pages).
Extended (Supplementary) European Search Report dated Mar. 6, 2019, issued in EP application No. 16832970.4 (counterpart to U.S. Appl. No. 15/749,148)(9 pages).

(56) References Cited

OTHER PUBLICATIONS

Final Office Action dated Oct. 15, 2021, issued in U.S. Appl. No. 15/749,148. (12 pages).
Final Office Action dated Feb. 24, 2021, issued in U.S. Appl. No. 15/749,250. (17 pages).
Extended Search Report dated Nov. 25, 2020, issued in EP Application No. 20189340.1 (counterpart to U.S. Appl. No. 15/749,250). (6 pages).
Extended (Supplementary) European Search Report dated Jun. 27, 2018, issued in Application No. 15873330.3 (counterpart to U.S. Appl. No. 15/539,926). (9 pages).
Extended (Supplementary) European Search Report dated Sep. 24, 2018, issued in application No. 15873331.1 (counterpart to U.S. Appl. No. 15/539,928). (9 pages).
Extended (Supplementary) European Search Report dated Mar. 7, 2019, issued in EP application No. 16839019.3 (counterpart to U.S. Appl. No. 15/754,406)(6 pages).
Extended (Supplementary) European Search Report dated Feb. 14, 2019, issued in EP application No. 16832969.6 (counterpart to U.S. Appl. No. 15/749,250)(6 pages).
Baris R. Mutiu et al., Silicon alkoxide cross-linked silica nanoparticles gels for encapsulation of bacterial biocatalysts, Journal of Materials Chemistry A., 2013. (10 pages).
Adachi et al., "Preparation of the Silica Gel Monolith by the Sol-Gel Method Using N, N-Dimethylformamide and the Vitrification of the Gel," Yogyo-Kyokai-Shi 95 [10] 1987, pp. 970-975, with English abstract (similar to the disclosure of T. Adachi et al., J. Mater. Sci., 22. 4407-4410, 1987, cited in the specifications of PCT/JP2015/086362 and PCT/JP2015/086363).
"What is Aerogel?" (Year:2008), cited in Non-Final Office Action dated Jun. 18, 2018, https;//web.archive.org/web/20080621095754/ http://www.aerogel.org/?p=3. (2 pages).
International Preliminary Report on Patentability (Form PCT/IB/373) dated Feb. 27, 2018 of International Application No. PCT/JP2016/072452(counterpartof U.S. Appl. No. 15/754,406), with Form PCT/ISA/237. (8 pages).
Non-Final Office Action dated Apr. 13, 2022, issued in U.S. Appl. No. 15/749,148. (21 pages).
Office Action dated Mar. 17, 2022, issued in CN application No. 201680043414.X (counterpart to U.S. Appl. No. 15/754,406), with partial English translation. (18 pages).
Kunshi Zhang, "Submarine optoelectronic equipment technology", Harbin Engineering University Press, published on Dec. 31, 2012, p. 233, with partial English translation, cited in CN Office Action dated Mar. 17, 2022. (4 pages).
Zhixian Zhang, "Synthetic resin and plastic grade manual", Chemical Industry Press, published on Jan. 31, 2001, the second edition, vol. 2, p. 318, with partial English translation, cited in CN Office Action dated Mar. 17, 2022. (4 pages).
Office Action dated Apr. 6, 2022, issued in CN application No. 202010325596.8 (counterpart to U.S. Appl. No. 15/539,927), with English translation. (8 pages).
Office Action dated May 20, 2022, issued in KR application No. 10-2017-7018505 (counterpart to U.S. Appl. No. 15/539,946), with English translation. (13 pages).
Office Action dated May 30, 2022, issued in KR application No. 10-2017-7018502 (counterpart to U.S. Appl. No. 15/539,926), with English translation. (15 pages).
Office Action dated May 30, 2022, issued in KR application No. 10-2017-7018503 (counterpart to U.S. Appl. No. 15/539,946), with English translation. (17 pages).
Office Action dated Jun. 2, 2022, issued in KR application No. 10-2017-7018507 (counterpart to U.S. Appl. No. 15/539,927), with English translation. (13 pages).
Office Action dated Jan. 26, 2022, issued in counterpart KR application No. 10-2018-7008684, with English translation. (15 pages).
Non-Final Office Action dated Aug. 4, 2022, issued in U.S. Appl. No. 15/539,946 (5 pages).
Office Action dated Aug. 26, 2022, issued in counterpart KR application No. 10-2018-7008684, with English translation. (17 pages).
Office Action dated Jul. 12, 2022, issued in counterpart JP application No. 2012-115086, with English translation. (5 pages).

* cited by examiner

US 11,524,481 B2

LOW REFRACTIVE INDEX LAYER, LAMINATED FILM, METHOD FOR PRODUCING LOW REFRACTIVE INDEX LAYER, METHOD FOR PRODUCING LAMINATED FILM, OPTICAL ELEMENT, AND IMAGE DISPLAY DEVICE

TECHNICAL FIELD

The present invention relates to a low refractive index layer, a laminated film, a method for producing the low refractive index layer, a method for producing the laminated film, an optical element, and an image display device.

BACKGROUND ART

When two substrates are disposed at a certain interval, an air layer is formed by a void space between the substrates. The air layer formed between the substrates function as a low refractive layer that totally reflects light, for example. On this account, in an optical film, for example, components such as a prism, a polarizing film, and a polarizing plate are disposed with certain distances between the respective components, so that air layers that functions as low refractive index layers are provided between the components. However, in order to form the air layers in this manner, it is necessary to dispose the respective components with certain distances therebetween. Thus, it is not possible to laminate the components successively, which makes the production process more complicated.

In order to solve the above problem, there have been attempts to develop, as an alternative to an air layer formed by a void space between components, a component such as a low refractive index film. As examples where such a component achieves both a high porosity and a high strength, cases where such a member is used as an antireflection layer of a lens have been reported (see Patent Documents 1 to 4, for example). According to the methods disclosed in these documents, a void-containing layer is formed on a lens and then baked at a high temperature of 150° C. or higher for a long time. However, the void-containing layer obtained in this manner has a problem in that, for example, it is inferior in flexibility and thus cannot be formed on a soft resin film. On the other hand, a case where a void-containing layer is formed without a baking treatment also has been reported (see Non-Patent Document 1, for example). However, the void-containing layer obtained by this method is inferior in film strength and the impact resistance thus cannot be obtained.

Also, methods for forming a silica aerogel film on a long resin support have been disclosed (see Patent Documents 5 and 6, for example). However, the silica aerogel films formed by these methods have a refractive index of more than 1.30, and thus cannot be an alternative to an air layer.

CITATION LIST

Patent Document(s)

Patent Document 1: JP 2006-297329 A
Patent Document 2: JP 2006-221144 A
Patent Document 3: JP 2006-011175 A
Patent Document 4: JP 2008-040171 A
Patent Document 5: JP 2006-096019 A
Patent Document 6: JP 2006-096967 A Non-Patent Document(s)

Non-Patent Document 1: J. Mater. Chem., 2011, 21, 14830-14837

BRIEF SUMMARY OF THE INVENTION

Problem to be Solved by the Invention

The void-containing layer (low refractive index layer) disclosed in each of the prior art documents etc. is formed by coating and drying a sol solution prepared by pulverizing silica aerogel, for example. However, when the void-containing layer (low refractive index layer) has a small thickness, the following problem may occur. That is, when a pressure-sensitive adhesive or the like applied to the void-containing layer enters void portions in the void-containing layer, it is difficult to maintain the void portions and the entire void portions may be filled with the pressure-sensitive adhesive or the like immediately.

One possible solution to the above-described problem is to increase the thickness of the void-containing layer (low refractive index layer), for example. However, an attempt to increase the thickness of the void-containing layer (low refractive index layer) by simply increasing the coating thickness of the sol solution, the coating layer may cause self-destruction owing to the shrinking force of the coating layer itself during the drying process, so that a low refractive index layer cannot be formed. On the other hand, another attempt to increase the thickness of the void-containing layer (low refractive index layer) by increasing the concentration of the sol solution may increase the viscosity of the sol solution abruptly, so that pulverization of the gel may not be achieved successfully, for example.

Means for Solving Problem

The present invention provides a low refractive index layer in the form of a void-containing layer, wherein hollow particles each having a void space inside are further contained in the void-containing layer, and the low refractive index layer has a refractive index of 1.25 or less.

The present invention also provides a laminated film including: a base; and the low refractive index layer according to the present invention laminated on the base.

The present invention also provides a method for producing the low refractive index layer according to the present invention, including the steps of: preparing a solution containing the hollow particles and one type or two or more types of structural units that form a structure with minute void spaces;
coating the solution; and drying the coated solution.

The present invention also provides a method for producing the laminated film according to the present invention, including the step of: forming the low refractive index layer on the base by the low refractive index layer production method according to the present invention.

The present invention also provides an optical element including: the low refractive index layer according to the present invention or the laminated film according to the present invention.

The present invention also provides an image display device including: the optical element according to the present invention.

Effects of the Invention

As described above, the low refractive index layer of the present invention is configured so that hollow particles each having a void space inside are further contained in the void-containing layer. With this configuration, the low refractive index layer can realize a low refractive index of 1.25 or less, and also can attain both the low refractive index and a high mechanical strength even when it has a large thickness. The low refractive index layer of the present invention can be produced by the low refractive index layer production method of the present invention, for example. The low refractive index layer of the present invention is useful in, for example, an optical element or the like that requires a low refractive index layer. Specifically, the low refractive index layer of the present invention can be used in the laminated film, optical element, and image display device according to the present invention, for example.

MODE FOR CARRYING OUT THE INVENTION

Figure 1:
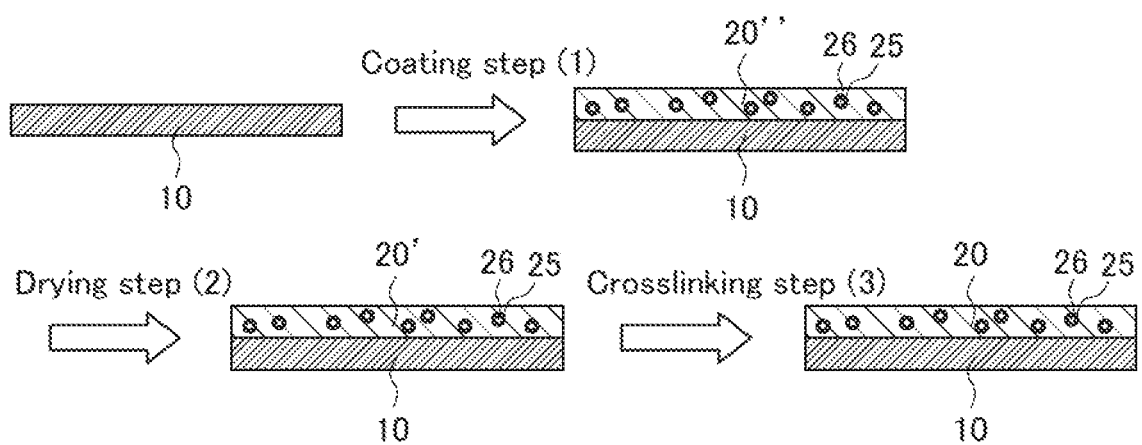
FIG. 1 is a sectional view schematically illustrating an example of a process of a method for forming a low refractive index layer 20 on a base 10 in the present invention.

The present invention will be described more specifically below with reference to illustrative examples. It is to be noted, however, that the present invention is by no means limited by the following descriptions.

As described above, the low refractive index layer of the present invention is configured so that hollow particles each having a void space inside are further contained in the void-containing layer. The void-containing layer may be formed by aggregation of three-dimensional structures, for example. Each of the three-dimensional structures may be a nanometer-sized three-dimensional structure, for example. The three-dimensional structure is not particularly limited, and may be a structural unit (three-dimensional structure) in a particulate form, a fibrous form, or a plate-like form to be described below, for example. The term "nanometer-sized" as used herein means, for example, at least one side of the three-dimensional structure (the width, the height, or the depth) is 1 nm or more and less than 1 μm. The at least one side may be from 1 to 900 nm, from 2 to 800 nm, or from 3 to 700 nm, for example. The three-dimensional structure may or may not contain a void space(s) per se. The three-dimensional structures may be composed of either the three-dimensional structures not containing a void space(s) per se only or the three-dimensional structures containing a void space(s) per se only, or may include both of them. The three-dimensional structure not containing a void space(s) per se is not particularly limited, and examples thereof include nanofibers and nanoclays. More specific examples thereof include acicular nanosilica and alumina nanofibers. The three-dimensional structure containing a void space(s) per se is not particularly limited, and examples thereof include hollow nanoparticles and particles produced by pulverizing a gel. More specific examples thereof include hollow silica particles and irregular shaped particles (pulverized particles) obtained by pulverizing a gel of a silica compound prepared through a sol-gel reaction. The pulverized particles each include, in its skeleton, a pore(s) formed by removing a solvent contained in the gel after the gelation, for example.

The void-containing layer may be formed of a gel, for example. That is, the low refractive index layer of the present invention may be configured so that hollow particles each having a void space inside are further contained in the gel having a void-containing structure.

As described above, the low refractive index layer of the present invention can realize a low refractive index of 1.25 or less, and also can attain both the low refractive index and a high mechanical strength even when it has a large thickness. Although the reason (mechanism) for this is not necessarily clear, it is speculated as follows, for example. Specifically, for example, when the hollow particles have a particle size of several tens of nanometers or more, it is possible to form the low refractive index layer with a large thickness by simply adding the hollow particles to a coating solution. For example, even when there is no difference in wet thickness (the thickness before being dried) of coating solutions, the coating solution containing the hollow particles can form a low refractive index layer with a larger thickness than the coating solution not containing the hollow particles. Although the reason for this is not necessarily clear, it is speculated as follows, for example. That is, when the coating solution does not contain the hollow particles, the materials forming the void-containing layer are deposited densely when the coating solution is dried, so that the thickness of the dried coating solution is reduced greatly. In contrast, when the coating solution contains the hollow particles, it is possible to inhibit such reduction in thickness. Besides, the hollow particles have void spaces per se. Accordingly, by adding the hollow particles, it is possible to increase the thickness of the low refractive index layer while causing little decrease in void fraction of the low refractive index layer. Further, for example, when the material of the hollow particles (e.g., silica) has the composition same as or similar to the composition of the material of the low refractive index layer present around the hollow particles, the hollow particles exhibit high interactivity (i.e., affinity) with the low refractive index layer. With this configuration, it is considered that, even when the hollow particles are added, it is possible to increase the thickness of the low refractive index layer without lowering the mechanical strength (e.g., the anchoring force exerted on the base) of the low refractive index layer. It is to be noted, however, that the above-described reasons (mechanisms) merely are examples based on the speculation and do not limit the present invention by any means.

The hollow particles are not particularly limited, and examples thereof include hollow silica particles and hollow nanoballoons. In particular, hollow nanosilica (hollow silica nanoparticles) and hollow silica nanoballoons are preferable. The "hollow nanoballoon" is not particularly limited, and generally refers to a hollow nanoparticle having a very thin surface skin.

Each of the hollow particles may have a void fraction from 10 to 95 vol %, from 13 to 90 vol %, or from 15 to 85 vol %, for example. The void fraction (porosity) of the hollow particle can be measured (calculated) in the following manner, for example.

(Method for Measuring [Calculating] Void Fraction of Hollow Particle)

A hollow particle has a core-shell structure. Accordingly, if the refractive index of the hollow particle is measured, it is possible to obtain the correlation between the refractive index and the void fraction. Thus, the refractive index of the hollow particle is calculated through fitting base on the slope formed by actual measured values and simulation values of the refractive index of the hollow particle. From the calculated value of the refractive index, the void fraction is calculated according to the Lorentz-Lorenz's formula.

The content of the hollow particles in the low refractive index layer is not particularly limited, and is, for example, 70 wt % or less, 60 wt % or less, or 50 wt % or less. Also, the content of the hollow particles in the low refractive index layer is, for example, 1 wt % or more, 3 wt % or more, or 5 wt % or more.

The volume average particle size of the hollow particles is, for example, from 10 to 500 nm, from 20 to 450 nm, or from 40 to 400 nm.

In the low refractive index layer of the present invention, for example, an abrasion resistance of the low refractive index layer measured with BEMCOT® and indicating a film strength is from 60% to 100%, and a folding endurance of the low refractive index layer measured by an MIT test and indicating a flexibility is 100 times or more.

In the low refractive index layer of the present invention, for example, one type or two or more types of structural units that form a structure with minute void spaces may be chemically bonded to each other to form the void-containing layer in the low refractive index layer. The structural units may be bonded to each other through bonds including a direct bond or an indirect bond, for example. In the low refractive index layer of the present invention, it is only required that at least some of the one type or two or more types of structural units are chemically bonded to each other, for example. Specifically, there may be some structural units that are not chemically bonded to each other while they are in contact with each other, for example. In the present invention, the state where the structural units are "indirectly bonded" to each other refers to the state where the structural units are bonded to each other via a binder component present in an amount equal to or smaller than the amount of the structural units. The state where the structural units are "directly bonded" to each other refers to the state where the structural units are bonded to each other directly without a binder component or the like.

In the low refractive index layer of the present invention, for example, the structural units may be bonded to each other through bonds including a hydrogen bond or a covalent bond. The structural units may be in at least one form selected from particulate forms, fibrous forms, and plate-like forms, for example. The particulate structural unit and the plate-like structural unit may be made of an inorganic substance, for example. The constituent element(s) of the particulate structural units includes at least one element selected from the group consisting of Si, Mg, Al, Ti, Zn, and Zr, for example. The particulate structure (structural unit) may be a solid particle or a hollow particle, and specific examples thereof include silicon particles and silicon particles having micropores. All or some of the particulate structural units may be hollow particles. The hollow particles are not particularly limited, and examples thereof include silica hollow nanoparticles and silica hollow nanoballoons, as described above. The fibrous structural unit may be, for example, a nanofiber with a nano-sized diameter, and specific examples thereof include cellulose nanofibers and alumina nanofibers. The plate-like structural unit may be, for example, nanoclay, and specific examples thereof include nano-sized bentonite (e.g., Kunipia F [trade name]). The fibrous structural is not particularly limited, and may be, for example, at least one fibrous substance selected from the group consisting of carbon nanofibers, cellulose nanofibers, alumina nanofibers, chitin nanofibers, chitosan nanofibers, polymer nanofibers, glass nanofibers, and silica nanofibers. The structural unit may or may not contain a void space(s) (pore[s]) per se. For example, the structural unit may be a porous body. Further, the structural unit may be a fiber or the like containing no void space (pore) per se, and void spaces formed among the structural units may form void spaces in the void-containing layer in the low refractive index layer of the present invention. Still further, the structural unit may contain a void space(s) (pore[s]) per se, and besides, void spaces formed among the structural units may form void spaces in the void-containing layer in the low refractive index layer of the present invention.

The low refractive index layer of the present invention is, for example, a porous body containing microporous particles. In the present invention, the shape of the "particle" (e.g., the microporous particle) is not particularly limited, and may be a spherical shape, a non-spherical shape, or the like, for example. In the present invention, the microporous particle may be, for example, a sol-gel beaded particle, a nanoparticle (hollow nanosilica/nanoballoon particle), a nanofiber, or the like, as described above.

In the low refractive index layer of the present invention, for example, the low refractive index layer has a void fraction of at least 40%.

In the low refractive index layer of the present invention, for example, the void-containing layer is a porous body, and the porous body has pores with a pore size from 2 to 200 nm.

In the low refractive index layer of the present invention, for example, the low refractive index layer has a thickness from 0.01 to 100 µm.

In the low refractive index layer of the present invention, for example, a haze value indicating a transparency of the low refractive index layer is less than 5%.

The low refractive index layer may contain an acid or a base that acts to improve a strength of the low refractive index layer when the acid or the base is subjected to at least one of light irradiation and heating, for example.

In the low refractive index layer production method of the present invention, for example, the low refractive index layer is formed by chemically bonding the one type or two or more types of structural units to each other.

The low refractive index layer production method according to the present invention may further include the step of, for example: adding a catalyst for chemically bonding the structural units to each other to the solution in the step of preparing the solution.

In the low refractive index layer production method of the present invention, for example, the catalyst is a catalyst that promotes crosslinking of the structural units.

In the low refractive index layer production method of the present invention, for example, the low refractive index layer is formed by bonding the structural units directly to each other.

In the low refractive index layer production method of the present invention, for example, the low refractive index layer is formed by bonding the structural units indirectly to each other.

In the low refractive index layer production method of the present invention, for example, the low refractive index layer is formed by bonding the structural units to each other through bonds including a hydrogen bond or a covalent bond.

In the low refractive index layer production method of the present invention, for example, the structural units are in at least one form selected from the group consisting of particulate forms, fibrous forms, and plate-like forms. The particulate structural unit and the plate-like structural unit may be made of an inorganic substance, for example. Also, for example, the constituent element(s) of the particulate structural unit may include at least one element selected from the group consisting of Si, Mg, Al, Ti, Zn, and Zr. The structural units may be microporous particles, for example.

The present invention will be described more specifically below with reference to illustrative examples. It is to be noted, however, that the present invention is not limited or restricted by the following descriptions.

[1. Laminated Film]

The use of the low refractive index layer of the present invention (may be referred to as "the void-containing layer of the present invention" or simply as "the void-containing layer" hereinafter) is not particularly limited. For example, as described above, the low refractive index layer of the present invention can be used in the laminated film of the present invention including a base and the low refractive index layer (void-containing layer) of the present invention laminated on the base. The present invention will be described below mainly regarding the laminated film of the present invention.

The laminated film of the present invention may be, for example, a laminated film in the form of a roll (the laminated film roll of the present invention), as described above. The laminated film roll of the present invention can be produced by, for example, forming the low refractive index layer of the present invention continuously on a long base. The laminated film of the present invention that is not in the form of a roll or not long can be produced by cutting out a part of the laminated film roll of the present invention, for example.

In the laminated film of the present invention, the base is a resin film, for example. Hereinafter, the term "resin film" refers to the base in the laminated film of the present invention, unless otherwise stated. The resin film is not particularly limited, and examples of the resin film include thermoplastic resins with high transparency, such as polyethylene terephthalate (PET), acrylic resins, cellulose acetate propionate (CAP), cycloolefin polymer (COP), triacetate (TAC), polyethylene naphthalate (PEN), polyethylene (PE), and polypropylene (PP).

In the laminated film roll or laminated film of the present invention, the low refractive index layer of the present invention may be laminated on the resin film directly, or may be laminated on the resin film via one or more other layers, for example.

When the low refractive index layer of the present invention is formed on the resin film, for example, the present invention can be referred to as, for example, a low refractive index member having the above-described properties, including: the resin film and the low refractive index layer laminated on the resin film.

As described above, the abrasion resistance of the low refractive index layer measured with BEMCOT® and indicating the film strength may be from 60% to 100%, for example. With the film strength in the above-described range, the low refractive index layer of the present invention is highly resistant to physical impacts that may be caused during a winding operation in a production process and in use, for example. The lower limit of the abrasion resistance is, for example, 60% or more, 80% or more, or 90% or more. The upper limit of the abrasion resistance is, for example, 100% or less, 99% or less, or 98% or less. The range of the abrasion resistance is, for example, from 60% to 100%, from 80% to 99%, or from 90% to 98%.

In the low refractive index layer of the laminated film roll or laminated film of the present invention, for example, the abrasion resistance of the low refractive index layer measured with BEMCOT® and indicating the film strength is from 60% to 100%, and the folding endurance of the low refractive index layer measured by an MIT test and indicating the flexibility is 100 times or more. The abrasion resistance can be measured in the following manner, for example.

(Evaluation of Abrasion Resistance)

(1) From a void-containing layer (the low refractive index layer of the present invention) formed on an acrylic film by coating, a circular cut piece with a diameter of about 15 mm is cut out as a sample.

(2) Next, regarding the sample, the coating amount of Si ($Si_0$) is measured by identifying silicon using an X-ray fluorescence spectrometer (ZSX Primus II, manufactured by Shimadzu Corporation). Next, a cut piece with a size of 50 mm×100 mm is cut out from the void-containing layer on the acrylic film. This cut piece is cut out from a vicinity of the site where the circular cut piece was obtained. The obtained cut piece is fixed onto a glass plate (thickness: 3 mm), and a sliding test is performed using BEMCOT®. The sliding conditions are as follows: weight: 100 g, reciprocation: 10 times.

(3) Regarding the void-containing layer having been subjected to the sliding, the sampling and the X-ray fluorescence measurement are performed in the same manner as in the above item (1) to measure the residual amount of Si ($Si_1$) after the abrasion test. The abrasion resistance is defined as the residual ratio of Si (%) before and after the sliding test performed using the BEMCOT®, and is represented by the following formula.

Abrasion resistance (%)=[the residual amount of Si ($Si_1$)/the coating amount of Si ($Si_0$)]×100(%)

The folding endurance of the low refractive index layer of the present invention measured by the MIT test and indicating the flexibility is, for example, 100 times or more, as described above. With the flexibility in the above-described range, the low refractive index layer of the present invention exhibits superior handleability during a winding operation in a continuous production process and in use, for example.

The lower limit of the folding endurance is, for example, 100 times or more, 500 times or more, or 1000 times or more. The upper limit of the folding endurance is not particularly limited, and is, for example, 10000 times or less. The range of the folding endurance is, for example, from 100 to 10000 times, from 500 to 10000 times, or from 1000 to 10000 times.

The term "flexibility" means the deformability of a substance, for example. The folding endurance can be measured by the MIT test in the following manner, for example.

(Evaluation by Folding Endurance Test)

The void-containing layer (the low refractive index layer of the present invention) is cut into a strip-shaped cut piece with a size of 20 mm×80 mm. The thus-obtained cut piece is set in an MIT folding endurance tester (BE-202, manufactured by TESTER SANGYO CO., LTD.), and 1.0 N load is applied thereto. As a chuck portion for holding the void-containing layer, R 2.0 mm is used, and the load is applied 10000 times at most. The number of times of the load application at which the void-containing layer is fractured is determined as the folding endurance.

The film density of the low refractive index layer of the present invention is not particularly limited. The lower limit of the film density is, for example, 1 g/cm$^3$ or more, 10 g/cm$^3$ or more, 15 g/cm$^3$ or more. The upper limit of the film density is, for example, 50 g/cm$^3$ or less, 40 g/cm$^3$ or less, or 30 g/cm$^3$ or less, or 2.1 g/cm$^3$ or less. The range of the film density is, for example, from 5 to 50 g/cm$^3$, from 10 to 40 g/cm$^3$, from 15 to 30 g/cm$^3$, or from 1 to 2.1 g/cm$^3$. In the low refractive index layer of the present invention, the lower limit of the porosity determined based on the film density is, for example, 50% or more, 70% or more, or 85% or more. The upper limit of the porosity is, for example, 98% or less or 95% or less. The range of the porosity is, for example, from 50% to 98%, from 70% to 95%, or from 85% to 95%.

The film density can be measured in the following manner, for example. The porosity can be calculated on the basis of the film density in the following manner, for example.

(Evaluation of Film Density and Porosity)

A void-containing layer (the low refractive index layer of the present invention) is formed on a base (acrylic film). Thereafter, regarding the void-containing layer in this laminate, the X-ray reflectance in a total reflection region is measured using an X-ray diffractometer (RINT-2000, manufactured by RIGAKU). Then, after fitting with Intensity at 2θ, the film density (g/cm$^3$) is calculated from the total reflection critical angle of the laminate (the void-containing layer and the base). Further, the porosity (P %) is calculated by the following formula.

Porosity ($P$%)=45.48×film density (g/cm$^3$)+100(%)

The low refractive index layer of the present invention has a pore structure, for example. In the present invention, the size of each void space in the pore structure indicates, out of the diameter of the long axis and the diameter of the short axis of the void space (pore), the diameter of the long axis. A preferable size of the void space (pore) is from 2 nm to 500 nm, for example. The lower limit of the size is, for example, 2 nm or more, 5 nm or more, 10 nm or more, or 20 nm or more. The upper limit of the size is, for example, 500 nm or less, 200 nm or less, or 100 nm or less. The range of the size is, for example, from 2 nm to 500 nm, from 5 nm to 500 nm, from 10 nm to 200 nm, or from 20 nm to 100 nm. A preferable size of the void spaces is determined depending on the use of the void-containing structure. Thus, it is necessary to adjust the size of the void spaces to a desired value according to the intended use, for example. The size of the void spaces can be evaluated in the following manner, for example.

(Evaluation of Size of Void Spaces)

In the present invention, the size of the void spaces can be quantified according to the BET test. Specifically, 0.1 g of a sample (the low refractive index layer of the present invention) is set in a capillary tube of a surface area measurement apparatus (ASAP 2020, manufactured by Micromeritics), and dried under reduced pressure at room temperature for 24 hours to remove gas in the void-containing structure. Then, an adsorption isotherm is created by causing the sample to adsorb nitrogen gas, whereby the pore distribution is determined. On the basis of the thus-determined pore distribution, the size of the void spaces can be evaluated.

As described above, the low refractive index layer of the present invention is configured so that hollow particles each having a void space inside are further contained in the void-containing layer. The void-containing layer may have, for example, a pore structure (porous structure) as described above, and the pore structure (porous structure) may be an open-cell structure in which pores are interconnected with each other, for example. The open-cell structure means that, for example, in a porous body (e.g., a silicone porous body) having the pore structure, pores three-dimensionally communicate with each other. In other words, the open-cell structure means the state where void spaces inside the pore structure are interconnected with each other. When a porous body has an open-cell structure, this structure allows the bulk body to have a higher porosity. However, in the case where closed-cell particles such as hollow silica particles are used, an open-cell structure cannot be formed. In contrast, in the low refractive index layer of the present invention, an open-cell structure can be formed easily for the following reason. For example, when silica sol particles (pulverized products of a gelled silicon compound for forming a sol) are used in the present invention, the silica sol particles each have a dendritic structure, so that the open-cell structure is formed as a result of sedimentation and deposition of the dendritic particles in a coating film (a coating film formed of a sol containing pulverized products of the gelled silicon compound). Further, it is more preferable that the low refractive index layer of the present invention forms a monolith structure, which is an open-cell structure including two or more types of micropore distributions. The monolith structure refers to a layered structure including a structure in which nano-sized void spaces are present and an open-cell structure formed by aggregation of the nano-sized spaces, for example. When the monolith structure is formed, for example, the film strength is imparted by the minute void spaces whereas a high porosity is achieved by the presence of the void spaces forming a bulky open-cell structure. Thus, both a film strength and a high porosity can be attained. In order to form such a monolith structure, for example, first, in the gel (gelled silicon compound) before being pulverized into the silica sol particles, it is preferable to control the micropore distributions in a void-containing structure to be generated. Also, the monolith structure can be formed by, for example, controlling, at the time of pulverizing the gelled silicon compound, the particle sizes of silica sol particles so that a desired particle size distribution can be obtained after the pulverization.

In the low refractive index layer of the present invention, the haze value indicating the transparency is not particularly limited. The upper limit thereof is, for example, less than 5%, preferably less than 3%. The lower limit thereof is, for example, 0.1% or more or 0.2% or more. The range of the haze value is, for example, 0.1% or more and less than 5%, or 0.2% or more and less than 3%.

The haze value can be measured in the following manner, for example.

(Evaluation of Haze Value)

A void-containing layer (the low refractive index layer of the present invention) is cut into a piece with a size of 50 mm×50 mm, and the thus-obtained cut piece is set in a haze meter (HM-150, manufactured by product of Murakami Color Research Laboratory) to measure the haze value. The haze value is calculated by the following formula.

Haze value (%)=[diffuse transmittance (%)/total light transmittance (%)]×100(%)

The "refractive index" of a given medium generally refers to the ratio of transmission speed of the wavefront of light in vacuum to the phase velocity of the light in the medium. The upper limit of the refractive index of the low refractive index layer of the present invention is, for example, 1.20 or less, or 1.15 or less. The lower limit thereof is, for example, 1.05 or more, 1.06 or more, or 1.07 or more. The range thereof is, for example, not less than 1.05 and not more than 1.20, not less than 1.06 and not more than 1.20, or not less than 1.07 and not more than 1.15.

In the present invention, the refractive index refers to the one measured at a wavelength of 550 nm, unless otherwise stated. The method for measuring the refractive index is not particularly limited. For example, the refractive index can be measured in the following manner.

(Evaluation of Refractive Index)

A void-containing layer (the low refractive index layer of the present invention) is formed on an acrylic film, and the obtained laminate is then cut into a piece with a size of 50 mm×50 mm. The thus-obtained cut piece is adhered onto a surface of a glass plate (thickness: 3 mm) with a pressure-sensitive adhesive layer. The central portion (diameter: about 20 mm) of the back surface of the glass plate is painted entirely with a black magic marker, thereby preparing a sample that allows no reflection at the back surface of the glass plate. The sample is set in an ellipsometer (VASE, manufactured by J. A. Woollam Japan), and the refractive index is measured at a wavelength of 500 nm and at an incidence angle of 50° to 80°. The mean value of the thus-obtained measured values is set as the refractive index.

When the low refractive index layer of the present invention is formed on, for example, the resin film, the peel adhesion strength (anchoring force) indicating the adhesion between the low refractive index layer and the resin film is not particularly limited. The lower limit thereof is, for example, 0.2 N/25 mm or more, 0.3 N/25 mm or more, 0.4 N/25 mm or more, 0.5 N/25 mm or more, 1 N/25 mm or more, 1.5 N/25 mm or more, 2 N/25 mm or more, or 3 N/25 mm or more. The upper limit thereof is, for example, 30 N/25 mm or less, 20 N/25 mm or less, or 10 N/25 mm or less. The range thereof is, for example, from 0.2 to 30 N/25 mm, from 0.3 to 30 N/25 mm, from 0.4 to 30 N/25 mm, from 0.5 to 30 N/25 mm, from 1 to 30 N/25 mm, from 1.5 to 30 N/25 mm, from 2 to 20 N/25 mm, or from 3 to 10 N/25 mm.

The method for measuring the peel adhesion strength (anchoring force) is not particularly limited. For example, the peel adhesion strength can be measured in the following manner.

(Evaluation of Peel Adhesion Strength [Anchoring Force])

A void-containing layer (the low refractive index layer of the present invention) is formed on an acrylic film, and a strip-shaped piece with a size of 50 mm×140 mm is then obtained as a sample from the thus-obtained laminate. The sample is fixed to a stainless plate with a double-sided tape. An acrylic pressure-sensitive adhesive layer (thickness: 20 μm) is adhered to a PET film (T100, manufactured by Mitsubishi Plastics, Inc.), and the thus-obtained adhesive tape is cut into a piece with a size of 25 mm×100 mm. The thus-obtained cut piece is adhered to the void-containing layer to form a laminate of the PET film and the void-containing layer. Then, the sample is chucked in a tensile testing machine (AG-Xplus, manufactured by Shimadzu Corporation) with a distance between chucks being 100 mm, and the tensile test is performed at a tensile speed of 0.3 m/min. The mean value of the peel test data for 50 mm set as the peel adhesion strength.

The thickness of the low refractive index layer of the present invention is not particularly limited. The lower limit thereof is, for example, 0.01 μm or more, 0.05 μm or more, 0.1 μm or more, or 0.3 μm or more. The upper limit thereof is, for example, 100 μm or less, 80 μm or less, 50 μm or less, or 10 μm or less. The range thereof is, for example, from 0.01 to 100 μm.

As described above, the low refractive index layer of the present invention is in the form of a void-containing layer, and hollow particles each having a void space inside are contained in the gel. The hollow particles are as described above, for example.

In the low refractive index layer of the present invention, as described above, the void-containing layer may contain pulverized products of a gelled compound, and the pulverized products may be chemically bonded to each other, for example. In the low refractive index layer of the present invention, the form of the chemical bonding (chemical bonds) between the pulverized products is not particularly limited. Specifically, the chemical bonds may be crosslinking bonds, for example. The method for chemically bonding the pulverized products to each other will be described below in detail in connection with the production method of the present invention.

The gel form of the gelled compound is not particularly limited. The term "gel" generally refers to a solidified state of a solute where particles of the solute have lost their independent mobility owing to interaction and form an aggregate. Among various types of gels, a "wet gel" generally refers to a gel containing a dispersion medium in which particles of a solute build a uniform structure, and a "xerogel" generally refers to a gel from which a solvent is removed and in which particles of a solute form a network structure with void spaces. In the present invention, the gelled compound may be a wet gel or a xerogel, for example.

The gelled compound can be, for example, a gelled product obtained by gelation of a monomer compound. Specifically, the gelled silicon compound may be, for example, a gelled product in which monomer silicon compounds are bonded to each other. Specific examples of the gelled product include a gelled product in which the monomer silicon compounds are bonded to each other by hydrogen bonding or intermolecular bonding. The bonding can be achieved by dehydration condensation, for example. The gelation method will be described below in connection with the production method of the present invention.

In the low refractive index layer of the present invention, the volume average particle size, which indicates variations in particle size, of the pulverized products is not particularly limited. The lower limit thereof is, for example, 0.10 μm or more, 0.20 μm or more, or 0.40 μm or more. The upper limit thereof is, for example, 2.00 μm or less, 1.50 μm or less, or 1.00 μm or less. The range thereof is, for example, from 0.10 μm to 2.00 μm, from 0.20 μm to 1.50 μm, or from 0.40 μm to 1.00 μm. The particle size distribution can be measured using a particle size distribution analyzer based on dynamic light scattering, laser diffraction, or the like, or using an electron microscope such as a scanning electron microscope (SEM) or a transmission electron microscope (TEM), for example.

The particle size distribution, which indicates variations in particle size, of the pulverized products is not particularly limited. The particle size distribution may be as follows, for example: the pulverized products are made up of 50 wt % to 99.9 wt %, 80 wt % to 99.8 wt %, or 90 wt % to 99.7 wt % of particles with a particle size from 0.4 μm to 1 μm and 0.1 wt % to 50 wt %, 0.2 wt % to 20 wt %, or 0.3 wt % to 10 wt % of particles with a particle size from 1 μm to 2 μm, for example. The particle size distribution can be measured using a particle size distribution analyzer or an electron microscope, for example.

In the low refractive index layer of the present invention, the type of the gelled compound is not particularly limited. The gelled compound may be a gelled silicon compound, for example. While the gelled compound will be described below with reference to an example where the gelled compound is a gelled silicon compound, the present invention is not limited thereto.

The crosslinking bonds are siloxane bonds, for example. Examples of the siloxane bonds include T2, T3, and T4 bonds shown below. When the low refractive index layer of the present invention includes siloxane bonds, the low refractive index layer may include any one of the T2, T3, and T4 bonds, any two of them, or all three of them, for example. As the proportions of T2 and T3 become higher, the low refractive index layer becomes more flexible, so that it is expected that the low refractive index layer exhibits characteristics intrinsic to the gel. However, the film strength of the low refractive index layer is deteriorated. When the proportion of T4 in the siloxane bonds becomes higher, a film strength is more likely to be obtained, whereas void spaces become smaller, resulting in deteriorated flexibility. Thus, it is preferable to adjust the proportions of T2, T3, and T4 depending on the intended use of the low refractive index layer, for example.

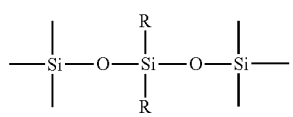

T2

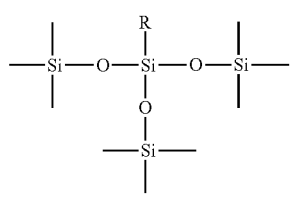

T3

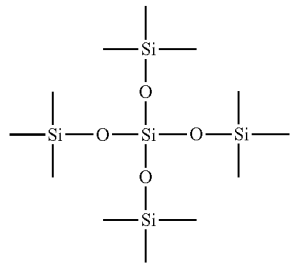

T4

In the case where the low refractive index layer of the present invention includes the siloxane bonds, the ratio of T2, T3, and T4 expressed relatively assuming that the proportion of T2 is "1" is as follows, for example: T2:T3:T4=1:[1 to 100]:[0 to 50], 1:[1 to 80]:[1 to 40], or 1:[5 to 60]:[1 to 30].

It is preferable that silicon atoms contained in the low refractive index layer of the present invention are bonded with each other through siloxane bonds, for example. As a specific example, the proportion of unbonded silicon atoms (i.e., residual silanol) among all the silicon atoms contained in the low refractive index layer is less than 50%, 30% or less, or 15% or less, for example.

When the gelled compound is the gelled silicon compound, the monomer silicon compound is not particularly limited. Examples of the monomer silicon compound include a compound represented by the following chemical formula (1). When the gelled silicon compound is a gelled product in which monomer silicon compounds are bonded to each other by hydrogen bonding or intermolecular bonding as described above, the monomers of the chemical formula (1) can be bonded to each other by hydrogen bonding via their hydroxyl groups, for example.

(1)

In the chemical formula (1), X is 2, 3, or 4, and $R^1$ is a linear or a branched alkyl group, for example. The number of carbon atoms in $R^1$ is 1 to 6, 1 to 4, or 1 to 2, for example. The linear alkyl group is a methyl group, an ethyl group, a propyl group, a butyl group, a pentyl group, or a hexyl group, for example. The branched alkyl group is an isopropyl group or an isobutyl group, for example. The X is 3 or 4, for example.

A specific example of the silicon compound represented by the chemical formula (1) is the one in which X is 3, which is a compound represented by the following chemical formula (1'). In the chemical formula (1'), $R^1$ is the same as that in the chemical formula (1), and is, for example, a methyl group. When $R^1$ is a methyl group, the silicon compound is tris(hydroxy)methylsilane. When X is 3, the silicon compound is a trifunctional silane having three functional groups, for example.

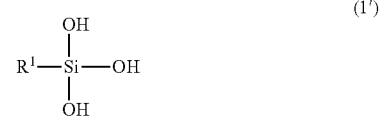

(1')

Another specific example of the silicon compound represented by the chemical formula (1) is the one in which X is 4. In this case, the silicon compound is a tetrafunctional silane having four functional groups, for example.

The monomer silicon compound may be a hydrolysate of a silicon compound precursor, for example. The silicon compound precursor is not limited as long as it can generate the silicon compound when it is hydrolyzed, for example. A specific example of the silicon compound precursor is a compound represented by the following chemical formula (2).

(2)

In the chemical formula (2), for example, X is 2, 3, or 4, $R^1$ and $R^2$ are each a linear or branched alkyl group, $R^1$ and $R^2$ may be the same or different from each other, $R^1$ may be the same or different from each other when X is 2, and $R^2$ may be the same or different from each other.

X and $R^1$ are the same as those in the chemical formula (1), for example. Regarding $R^2$, reference can be made to the description as to the examples of $R^1$ in the chemical formula (1), for example.

A specific example of the silicon compound precursor represented by the chemical formula (2) is the one in which X is 3, which is a compound represented by the following chemical formula (2'). In the chemical formula (2'), $R^1$ and $R^2$ are the same as those in the chemical formula (2). When $R^1$ and $R^2$ are both methyl groups, the silicon compound precursor is trimethoxy(methyl)silane (also referred to as "MTMS" hereinafter).

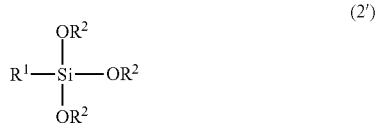

(2')

The monomer silicon compound preferably is the trifunctional silane in terms of its excellent properties to allow realization of a low refractive index. The monomer silicon compound preferably is the tetrafunctional silane from the viewpoint of imparting a high strength (e.g., abrasion resistance). As the monomer silicon compounds as a raw material of the gelled silicon compound, only one type of monomer silicon compounds may be used, or two or more types of monomer silicon compounds may be used in combination, for example. Specifically, the monomer silicon compounds may be made up of the trifunctional silane only, the tetrafunctional silane only, or both the trifunctional silane and the tetrafunctional silane, for example. Also, the monomer silicon compounds further may include silicon compound(s) other than the trifunctional silane and the tetrafunctional silane, for example. When two or more types of silicon compounds are used as the monomer silicon compounds, the ratio thereof is not particularly limited, and can be set as appropriate.

The form of the low refractive index layer of the present invention is not particularly limited. Typically, the low refractive index layer of the present invention is in the form of a film.

The low refractive index layer of the present invention may be a roll, for example. Also, as described above, the low refractive index layer of the present invention may be the laminated film of the present invention obtained by forming the low refractive index layer on a long base (resin film), for example. In this case, another long film may be laminated on the laminated film of the present invention. The laminated film of the present invention may be in the form of a roll obtained by laminating another long resin film (e.g., interleaving paper, release film, surface protection film, or the like) on the laminated film of the present invention including the resin film and the low refractive index layer and then winding the thus-obtained laminate to form a roll.

The method for producing the low refractive index layer, laminated film, or laminated film roll of the present invention is not particularly limited. For example, the low refractive index layer, laminated film, or laminated film roll of the present invention can be produced by the production method of the present invention to be described below.

[2. Production Method of Low Refractive Index Layer, Laminated Film, or Laminated Film Roll]

The method for producing the low refractive index layer, laminated film, or laminated film roll of the present invention preferably includes the steps of; preparing a solution containing the hollow particles and one type or two or more types of structural units that form a structure with minute void spaces; coating the solution; and drying the coated solution, as described above. However, the present invention is not limited thereto. The one type or two or more types of structural units that form a structure with minute void spaces are not particularly limited, and may be as described above, for example. In the following, the present invention will be described mainly with reference to an example where the structural units are microporous particles.

The solution containing the microporous particles (also may be referred to as a "microporous particle-containing solution" hereinafter) is not particularly limited, and may be a suspension containing the microporous particles, for example. The present invention will be described below mainly with reference to an example where the microporous particles are pulverized products of a gelled compound and the low refractive index layer is a porous body (preferably a silicone porous body) including the pulverized products of the gelled compound. It is to be noted, however, that the present invention also can be carried out in the same manner when the microporous particles are other than the pulverized products of the gelled compound. In the method for producing the low refractive index layer, laminated film, or laminated film roll of the present invention, the low refractive index layer is, for example, a porous body in which microporous particles are chemically bonded to each other, and the microporous particles are chemically bonded to each other in the steps of forming a low refractive index layer. The microporous particles are, for example, microporous particles of a silicon compound, and the porous body is a silicone porous body. Examples of the microporous particles of the silicon compound include pulverized products of a gelled silica compound. Another embodiment of the low refractive index layer is a void-containing layer in which nanometer-sized three-dimensional structures are fibrous substances such as nanofibers and void spaces are formed by entanglement of the fibrous substances. The method for producing the low refractive index layer (void-containing layer) formed using the fibrous substances may be the same as the method for producing the low refractive index layer (void-containing layer) formed using the microporous particles, for example. Other embodiments of the low refractive index layer of the present invention include: a void-containing layer in which the nanometer-sized three-dimensional structures are nanoclays; and a void-containing layer formed using magnesium fluoride. These low refractive index layers may be formed of a single component or a plurality of components. The void-containing layer may adopt one of the above-described embodiments or two or more of the above-described embodiments. The present invention will be described below mainly with reference to an example where the void-containing layer is a porous body in which the microporous particles are chemically bonded to each other.

According to the production method of the present invention, a low refractive index layer that exhibits a favorably low refractive index can be obtained. The reason for this is speculated as follows, for example. However, the present invention is not limited by this speculation.

The pulverized products used in the production method of the present invention are obtained by pulverizing the gelled silicon compound, for example. Thus, the three-dimensional structure of the gelled silicon compound before being pulverized is dispersed in three-dimensional basic structures of the pulverized products. In the production method of the present invention, by coating the pulverized products of the gelled silicon compound onto the base, a precursor having a porous structure based on the three-dimensional basic structures is formed. That is, according to the production method of the present invention, a new porous structure that is different from the three-dimensional structure of the gelled silicon compound is provided by the pulverized products having the three-dimensional basic structures. Thus, the low refractive index layer to be obtained finally can achieve a low refractive index comparable to that of an air layer, for example. Moreover, in the production method of the present invention, the pulverized products are chemically bonded to each other, whereby the new three-dimensional structure is immobilized. Thus, even though the low refractive index layer to be obtained finally has a structure with void spaces, it can maintain a sufficient strength and sufficient flexibility. As described above, the low refractive index layer obtained by the production method of the present invention is useful as an alternative to an air layer in terms of low refractive index as well as in strength and flexibility, for example. In the case of an air layer, in order to form the air layer between components, it is necessary to laminate the components with a space therebetween by providing a spacer or the like, for example. In contrast, the low refractive index layer obtained by the production method of the present invention can achieve a low refractive index comparable to an air layer by merely disposing it at a desired site, for example. Therefore, as described above, the present invention can allow an optical element to exhibit a low refractive index comparable to that of an air layer more easily and simply as compared with the case of forming the air layer.

The above description regarding the low refractive index layer of the present invention also applies to the production method of the present invention, unless otherwise stated.

The above descriptions regarding the low refractive index layer of the present invention and the void-containing layer forming the low refractive index also apply to the gelled compound, the pulverized products thereof, the monomer compound, and the monomer compound precursor in the production method of the present invention.

The production method of the present invention includes the step of preparing a solution containing microporous particles, as described above. When the microporous particles are pulverized products of a gelled compound, the pulverized products can be obtained by pulverizing the gelled compound, for example. By pulverizing the gelled compound, the three-dimensional structure of the gelled compound is destroyed and dispersed in the three-dimensional basic structures, as described above.

Generation of the gelled compound by gelation of the monomer compounds and preparation of the pulverized products by pulverization of the gelled compound will be described below. It is to be noted, however, that he present invention is not limited by the following illustrative descriptions.

The gelation of the monomer compounds can be achieved by bonding the monomer compounds by hydrogen bonding or intermolecular bonding, for example.

The monomer compound may be, for example, a silicon compound represented by the chemical formula (1) described above in connection with the low refractive index layer of the present invention.

The silicon compound represented by the chemical formula (1) has a hydroxyl groups. Thus, monomers of the chemical formula (1) can be bonded to each other by hydrogen bonding or intermolecular bonding via their hydroxyl groups, for example.

As described above, the silicon compound may be a hydrolysate of a silicon compound precursor, and may be generated by hydrolyzing the silicon compound precursor represented by the chemical formula (2) and described above in connection with the low refractive index layer of the present invention, for example.

The method for hydrolyzing the monomer compound precursor is not particularly limited. For example, the monomer compound precursor can be hydrolyzed through a chemical reaction in the presence of a catalyst. Examples of the catalyst include acids such as an oxalic acid and an acetic acid. The hydrolysis reaction can be caused by, for example, adding an oxalic acid aqueous solution dropwise slowly to a mixture (e.g., suspension) of the silicon compound and dimethylsulfoxide at room temperature and then stirring the resultant mixture for about 30 minutes. In hydrolysis of the silicon compound precursor, for example, by hydrolyzing the alkoxy group of the silicon compound precursor completely, it is possible to more efficiently achieve gelation and aging to be performed subsequently and heating and immobilization to be performed after the formation of a void-containing structure.

The gelation of the monomer compounds can be achieved by a dehydration condensation reaction of the monomers, for example. The dehydration condensation reaction preferably is performed in the presence of a catalyst, for example. Examples of the catalyst include dehydration condensation catalysts such as: acid catalysts including a hydrochloric acid, an oxalic acid, and a sulfuric acid; and base catalysts including ammonia, potassium hydroxide, sodium hydroxide, and ammonium hydroxide. The dehydration condensation catalyst particularly preferably is a base catalyst. In the dehydration condensation reaction, the amount of the catalyst to be added relative to the monomer compounds is not particularly limited, and is, for example, 0.1 to 10 mol, 0.05 to 7 mol, or 0.1 to 5 mol per mole of the monomer compounds.

The gelation of the monomer compounds preferably is performed in a solvent, for example. The proportion of the monomer compounds in the solvent is not particularly limited. Examples of the solvent include dimethylsulfoxide (DMSO), N-methylpyrrolidone (NMP), N, N-dimethylacetamide (DMAc), dimethylformamide (DMF), γ-butyrolactone (GBL), acetonitrile (MeCN), and ethylene glycol ethyl ether (EGEE). One type of solvent may be used, or two or more types of solvents may be used in combination, for example. Hereinafter, the solvent used for the gelation also is referred to as a "gelation solvent".

The conditions for the gelation are not particularly limited. The treatment temperature for treating the solvent containing the monomer compounds is, for example, 20° C. to 30° C., 22° C. to 28° C., or 24° C. to 26° C., and the treatment time for treating the same is, for example, 1 to 60 minutes, 5 to 40 minutes, or 10 to 30 minutes. When the dehydration condensation reaction is performed, the treatment conditions are not particularly limited, and the treatment conditions given above as examples also apply to the dehydration condensation reaction. By the gelation, for example, siloxane bonds are grown and silica primary particles are formed. As the reaction further proceeds, the primary particles are connected in the form of a string of beads, whereby a gel having a three-dimensional structure is generated.

The gelled compound obtained by the gelation preferably is subjected to an aging treatment after the gelation reaction. For example, by further growing the primary particles of the gel having a three-dimensional structure obtained by the gelation through the aging treatment, it is possible to increase the size of the particles themselves. As a result, the contact area at the neck portion where the particles are in contact with each other increases so that the contact state can be changed from point contact to surface contact. The above-described aging treatment improves the strength of the gel itself, for example, whereby the strength of the three-dimensional basic structures after pulverization can be improved. As a result, it is possible to reduce the possibility that, in the drying step to be performed after coating the pulverized products, pores in the void-containing structure formed by deposition of the three-dimensional basic structures may become smaller as the solvent volatilizes during the drying process, for example.

The aging treatment can be performed by, for example, incubating the gelled compound at a predetermined temperature for a predetermined time. The predetermined temperature is not particularly limited. The lower limit thereof is, for example, 30° C. or higher, 35° C. or higher, or 40° C. or higher. The upper limit thereof is, for example, 80° C. or lower, 75° C. or lower, or 70° C. or lower. The range thereof is, for example, from 30° C. to 80° C., from 35° C. to 75° C., or from 40° C. to 70° C. The predetermined time is not particularly limited. The lower limit thereof is, for example, 5 hours or more, 10 hours or more, or 15 hours or more. The upper limit thereof is, for example, 50 hours or less, 40 hours or less, or 30 hours or less. The range thereof is, for example, from 5 to 50 hours, from 10 to 40 hours, or from 15 to 30 hours. Optimal aging conditions are, for example, conditions that mainly aim to increase the size of the silica primary particles and to increase the contact area at the neck portion. Furthermore, it is preferable to take the boiling point of the solvent used in the aging treatment into consideration. For example, when the aging temperature is too high, the solvent may volatilize excessively to cause defectiveness such that the pores in the three-dimensional void-containing structure are closed owing to the condensation of the concentration of a coating solution (gel solution). On the other hand, for example, when the aging temperature is too low, the effect of the aging cannot be obtained sufficiently. Besides, variation in temperature over time in a mass production process increases, which may result in products with poor quality.

In the aging treatment, the same solvent as in the gelation treatment can be used, for example. Specifically, it is preferable that a reactant obtained after the gelation treatment (i.e., the solvent containing the gelled compound) is subjected to the aging treatment as it is. In the gel (the gelled compound, e.g., the gelled silicon compound) having been subjected to the gelation and the subsequent aging treatment, the number of moles of residual silanol groups indicates, for example, the proportion of the residual silanol groups, assuming that the number of moles of the alkoxy groups in the added raw material (e.g., the monomer compound precursor) is 100. The lower limit thereof is, for example, 50% or more, 40% or more, or 30% or more. The upper limit thereof is, for example, 1% or less, 3% or less, or 5% or less. The range thereof is, for example, from 1% to 50%, from 3% to 40%, or from 5% to 30%. For the purpose of increasing the hardness of the gel, it is preferable that the number of moles of the residual silanol groups is smaller, for example. When the number of moles of the silanol groups is too large, there is a possibility that the void-containing structure cannot be maintained until the crosslinking of the silicone porous body precursor is completed, for example. On the other hand, when the number of moles of the silanol groups is too small, there is a possibility that, in the step of preparing the solution (e.g., suspension) containing the microporous particles and/or the subsequent steps, the pulverized products of the gelled compound cannot be crosslinked, so that a sufficient film strength cannot be imparted, for example. The above description is directed to an example where silanol groups are used. When the monomer silicon compounds are modified with any of other various reactive functional groups, for example, the same phenomenon applies to each of the reactive functional groups.

After the gelation of the monomer compounds in the gelation solvent, the obtained gelled compound is pulverized. The gelled compound in the gelation solvent may be subjected to pulverization as it is. Alternatively, the gelation solvent may be replaced by another solvent, and the gelled compound in the another solvent may be subjected to pulverization, for example. Further, if the catalyst and solvent used in the gelation reaction remain after the aging step to cause gelation of the solution over time (pot life) and reduction in drying efficiency in the drying step, it is preferable to replace the gelation solvent by another solvent. Hereinafter, such a solvent for replacement also may be referred to as a "pulverization solvent".

The pulverization solvent is not particularly limited, and may be an organic solvent, for example. The organic solvent may be the one having a boiling point of 130° C. or lower, 100° C. or lower, or 85° C. or lower, for example. Specific examples thereof include isopropyl alcohol (IPA), ethanol, methanol, butanol, propylene glycol monomethyl ether (PGME), methyl cellosolve, acetone, and dimethylformamide (DMF). One type of pulverization solvent may be used, or two or more types of pulverization solvents may be used in combination.

The combination of the gelation solvent and the pulverization solvent is not particularly limited, and examples thereof include the combinations of: DMSO and IPA;

DMSO and ethanol; DMSO and methanol; and DMSO and butanol. By replacing the gelation solvent by the pulverization solvent as described above, it is possible to form a more uniform coating film in the formation of the coating film to be described below, for example.

The method for pulverizing the gelled compound is not particularly limited. For example, the gelled compound can be pulverized using an ultrasonic homogenizer, a high-speed rotary homogenizer, a pulverizer utilizing any other cavitation phenomenon, or a pulverizer that causes oblique collision of a solution at a high pressure. An apparatus that performs media pulverization, such as a ball mill, physically destroys the void-containing structure of a gel during pulverization, for example. In contrast, a cavitation-type pulverizer, such as a homogenizer, preferably used in the present invention is based on a media-less pulverizing method, and separates the bonded surfaces of silica particles bonded relatively weakly and already contained in a gel three-dimensional structure and bonded relatively weakly with a high speed shear force, for example. Thus, a three-dimensional sol structure obtained thereby can maintain a void-containing structure having a particle size distribution within a certain range and can form a void-containing structure again by deposition during coating and drying, for example. The conditions for the pulverization are not particularly limited, and preferably are conditions that allow a gel to be pulverized without volatilizing a solvent by imparting a high speed flow instantaneously, for example. For example, it is preferable to pulverize the gel in such a manner that pulverized products having the above described variations in particle size (e.g., volume average particle size or particle size distribution) can be obtained. If the amount of work such as the pulverization time or the pulverization strength is not sufficient, coarse particles may remain, so that there is a possibility not only that fine pores cannot be formed but also that a high quality cannot be achieved owing to increased defects in appearance, for example. On the other hand, if the amount of work is too much, sol particles to be obtained may be too small to achieve a desired particle size distribution. This may reduce the size of void spaces formed by deposition of the particles after coating and drying, so that a desired porosity may not be achieved, for example.

A solution (e.g., suspension) containing the microporous particles can be prepared in the above-described manner. The low refractive index layer of the present invention can be produced by further adding the hollow particles to the solution in addition to the microporous particles, and then coating and drying the solution.

By further adding a catalyst for chemically bonding the microporous particles after or during the preparation of the solution containing the microporous particles, it is possible to prepare a solution containing the microporous particles and the catalyst. The low refractive index layer of the present invention can be produced by further adding the hollow particles to this solution and then coating and drying the solution. The order of adding the catalyst and the hollow particles is not particularly limited. The catalyst may be added first, the hollow particles may be added first, or they may be added at the same time. By this catalyst, the microporous particles can be bonded chemically to each other in the bonding step to be described below, for example. Use of the catalyst is optional in the present invention, and the catalyst may or may not be used. The catalyst may be, for example, a catalyst that promotes crosslinking of the microporous particles. The chemical reaction for chemically bonding the microporous particles to each other preferably is a reaction utilizing a dehydration condensation reaction of residual silanol groups contained in silica sol molecules. By promoting the reaction between the hydroxyl groups in the silanol groups by the catalyst, the void-containing structure can be cured in a short time, so that continuous film formation becomes possible. The catalyst may be a photoactive catalyst or a thermoactive catalyst, for example. With the use of the photoactive catalyst, the microporous particles can be bonded (e.g., crosslinked) to each other without heating, for example. Accordingly, the shrinkage due to heating is less liable to occur, so that it is possible to maintain a higher void fraction, for example. In addition to or instead of the catalyst, a substance that generates a catalyst (catalyst generator) may be used. For example, the catalyst may be a crosslinking reaction accelerator, and the catalyst generator may be a substance that generates the crosslinking reaction accelerator. For example, in addition to or instead of the photoactive catalyst, a substance that generates a catalyst when subjected to light irradiation (photocatalyst generator) may be used, and in addition to or instead of the thermoactive catalyst, a substance that generates a catalyst when heated (thermal catalyst generator) may be used. The photocatalyst generator is not particularly limited, and may be, for example, a photobase generator (a substance that generates a basic catalyst when subjected to light irradiation) or a photoacid generator (a substance that generates an acidic catalyst when subjected to light irradiation). Among them, the photobase generator is preferable. Examples of the photobase generator include 9-anthrylmethyl N, N-diethylcarbamate (trade name: WPBG-018), (E)-1[3-(2-hydroxyphenyl)-2-propenoyl]piperidine (trade name: WPBG-027), 1-(anthraquinon-2-yl)ethyl imidazolecarboxylate (trade name: WPBG-140), 2-nitrophenylmethyl 4-methacryloyloxypiperidine-1-carboxylate (trade name: WPBG-165), 1,2-diisopropyl-3-[bis(dimethylamino) methylene] guanidium 2-(3-benzoylphenyl)propionate (trade name: WPBG-266), 1,2-dicyclohexyl-4,4,5,5-tetramethylbiguanidium n-butyltriphenylborate (trade name: WPBG-300), 2-(9-oxoxanthen-2-yl)propionic acid 1,5,7-triazabicyclo [4.4.0]dec-5-ene (Tokyo Kasei Kogyo Co., Ltd.), and a compound containing 4-piperidinemethanol (trade name: HDPD-PB100, manufactured by Heraeus). Note here that the above products with the trade names including "WPBG" are all manufactured by Wako Pure Chemical Industries, Ltd. Examples of the photoacid generator include aromatic sulfonium salt (trade name: SP-170, manufactured by ADEKA), triarylsulfonium salt (trade name: CPI101A, manufactured by San-Apro Ltd.), and aromatic iodonium salt (trade name: Irgacure 250, manufactured by Ciba Japan). The catalyst for chemically bonding the microporous particles to each other is not limited to the photoactive catalyst, and may be a thermoactive catalyst such as urea, for example. Examples of the catalyst for chemically bonding the microporous particles to each other include: base catalysts such as potassium hydroxide, sodium hydroxide, and ammonium hydroxide; and acid catalysts such as a hydrochloric acid, an acetic acid, and an oxalic acid. Among them, the base catalysts are preferable. The catalyst for chemically bonding the microporous particles to each other can be used by adding it to a sol particle solution (e.g., suspension) containing the pulverized products (microporous particles) immediately before coating the sol particle solution, or can be used in the form of a mixture with a solvent, for example. The mixture may be, for example, a coating solution obtained by adding the catalyst directly to and dissolving the catalyst in the sol particle solution, a solution obtained by dissolving the catalyst in a solvent, or a dispersion obtained by dispersing the catalyst in a solvent. The solvent is not particularly limited, and examples thereof include various organic solvents, water, and buffer solutions. The amount of the catalyst to be added is not particularly limited, and is, for example, 0.01 to 20 wt %, 0.05 to 10 wt %, or 0.1 to 5 wt % relative to the solid content in the gel.

A sol solution containing silica porous particles used for the production of the low refractive index layer of the present invention may contain, for example, when the silica porous particles are pulverized products of a gelled silicon compound obtained from silicon compounds at least containing three or less functional groups having saturated bonds, a crosslinking assisting agent for indirectly bonding the pulverized products to each other. This crosslinking assisting agent enters the spaces between the respective particles, where it interacts with or bonds to the particles. This allows the particles somewhat apart from each other to be bonded to each other. As a result, it becomes possible to efficiently improve the strength. The crosslinking assisting agent preferably is a multi-crosslinking silane monomer. Specifically, the multi-crosslinking silane monomer may have at least two and at most three alkoxysilyl groups, the chain length between the alkoxysilyl groups may be at least one and at most ten carbon atoms, and the multi-crosslinking silane monomer may contain an element other than carbon, for example. Examples of the crosslinking assisting agent include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis (triethoxysilyl)hexane, bis(trimethoxysilyl)hexane, bis (trimethoxysilyl)-N-butyl-N-propyl-ethane-1,2-diamine, tris-(3-trimethoxysilylpropyl)isocyanurate, and tris-(3-triethoxysilylpropyl)isocyanurate. The amount of the crosslinking assisting agent to be added is not particularly limited, and is, for example, in the range from 0.01 wt % to 20 wt %, from 0.05 wt % to 15 wt %, or from 0.1 wt % to 10 wt % relative to the solid content in the gel. Further, it is speculated that the crosslinking assisting agent also acts on surface layers of the hollow particles contained in the low refractive index layer of the present invention, thereby allowing the formation of a more strongly-bonded complex, for example. It is to be noted, however, that, this speculation is merely illustrative and does not limit the present invention by any means.

As described above, the production method of the present invention includes the step of coating the microporous particle-containing solution (e.g., suspension) containing the hollow particles onto a resin film, for example. The coating can be performed by various coating methods to be described below, for example. It is to be noted, however, that the coating method is not limited thereto. By directly coating a solvent containing the pulverized products onto the base, the porous body precursor (coating film) can be formed. The porous body precursor also can be referred to as a coating layer, for example. The porous body precursor, i.e., the porous body precursor before being subjected to the bonding step to be described below, also can be referred to as a precursor film (or precursor layer) of the low refractive index layer of the present invention, for example. By forming the porous body precursor (coating film), for example, sedimentation and deposition of the pulverized products obtained after the three-dimensional structures have been destroyed are allowed to occur, whereby a new three-dimensional structure is constructed.

The solvent (also referred to as "coating solvent" hereinafter) is not particularly limited, and may be an organic solvent, for example. The organic solvent may be the one having a boiling point of 130° C. or lower, for example. Specific examples thereof include IPA, ethanol, methanol, and butanol. Also, the solvents same as those given above as examples of the pulverization solvent can be used as the coating solvent. When the production method of the present invention includes the step of pulverizing the gelled compound, for example, the pulverization solvent containing the pulverized products of the gelled compound may be used as it is in the step of forming the porous body precursor.

In the coating step, for example, it is preferable to coat a sol obtained by dispersing pulverized products in the solvent (also referred to as a "sol particle solution" hereinafter) onto the base. By coating the sol particle solution of the present invention onto the base, drying the sol particle solution, and chemically crosslinking the particles in the sol particle solution in the bonding step, for example, a void-containing layer having a film strength at or above a certain level can be formed continuously. The term "sol" as used in the present invention refers to a state where, by pulverizing a three-dimensional structure of a gel, silica sol particles each having a three-dimensional nanostructure holding part of the void-containing structure are dispersed in a solvent and exhibit fluidity.

The concentration of the pulverized products in the solvent is not particularly limited, and is, for example, in the range from 0.3% to 50% (v/v), 0.5% to 30% (v/v), or 1.0% to 10% (v/v). When the concentration of the pulverized products is too high, the fluidity of the sol particle solution is reduced considerably, which may result in aggregation and the formation of coating streaks during the coating, for example. On the other hand, when the concentration of the pulverized products is too low, it may take a long time to dry the solvent of the sol particle solution, and besides, the residual solvent immediately after the drying may increase to lower the porosity, for example.

The physical properties of the sol are not particularly limited. The shear viscosity of the sol is, for example, 100 cPa·s or less, 10 cPa·s or less, or 1 cPa·s or less at a shear rate of, for example, 10001/s. When the shear viscosity is too high, for example, coating streaks may be formed, which may cause defects such as a decrease in transfer ratio in gravure coating. On the other hand, when the shear viscosity is too low, for example, it may not be possible to provide a sufficient wet thickness of the sol particle solution when coating the sol particle solution, so that a desired thickness cannot be obtained after drying.

The amount of the pulverized products to be coated onto the base is not particularly limited, and can be set as appropriate depending on, for example, a desired thickness of the silicone porous body. As a specific example, when the silicone porous body having a thickness from 0.1 to 1000 μm is to be formed, the amount of the pulverized products to be coated onto the base is, for example, in the range from 0.01 to 60000 μg, 0.1 to 5000 μg, or 1 to 50 μg per square meter of the base. It is difficult to uniquely define a preferable amount of the sol particle solution to be coated, because it may be affected by the concentration of the solution, the coating method, etc., for example. However, in terms of productivity, it is preferable to make a coating layer as thin as possible. When the coating amount is too large, for example, it is likely that the solvent may be dried in a drying oven before it volatilizes. If the solvent is dried before the void-containing structure is formed by the sedimentation and deposition of nano-sized pulverized sol particles in the solvent, formation of void spaces may be inhibited to lower the porosity considerably. On the other hand, when the coating amount is too small, the risk of cissing due to unevenness, variation in hydrophilicity and hydrophobicity, etc. on the surface of the base may increase.

Furthermore, as described above, the production method of the present invention includes the step of drying the microporous particle-containing solution containing the hollow particles (porous body precursor [coating film]) coated onto the base, for example. The purpose of the drying treatment is not only to remove the solvent in the porous body precursor (the solvent contained in the sol particle solution) but also to allow the sedimentation and deposition of the sol particles to occur to form a void-containing structure during the drying treatment, for example. The temperature of the drying treatment is from 50° C. to 250° C., from 60° C. to 150° C., or from 70° C. to 130° C., for example, and the time of the drying treatment is from 0.1 to 30 minutes, from 0.2 to 10 minutes, or from 0.3 to 3 minutes, for example. In terms of continuous productivity and realization of high porosity, it is preferable to set the temperature and the time of the drying treatment lower and shorter, respectively, for example. If the conditions are too stringent, the following problem may arise, for example. That is, when the base is a resin film, for example, the base may extend in a drying oven as the temperature approaches the glass-transition temperature of the base, so that a void-containing structure formed immediately after the coating may have defects such as cracks. On the other hand, when the conditions are too mild, the following problem may arise, for example. That is, the film may contain a residual solvent when it comes out of the drying oven, so that, if the film rubs against a roller in a subsequent step, defects in appearance such as scratches may be caused.

The drying treatment may be natural drying, heat drying, or drying under reduced pressure, for example. The drying method is not particularly limited, and a commonly used heating unit can be used, for example. Examples of the heating unit include a hot air fan, a heating roller, and a far-infrared heater. In particular, from the viewpoint of performing continuous production industrially, heat drying is preferable. It is preferable to use a solvent having a low surface tension for the purpose of inhibiting the shrinkage stress that may occur as the solvent volatizes during the drying process and inhibiting a crack phenomenon in the void-containing layer (e.g., the silicone porous body) caused by the shrinkage stress. Examples of the solvent include, but are not limited to, lower alcohols (typically, isopropyl alcohol [IPA]), hexane, and perfluorohexane. The surface tension may be lowered by adding a small amount of a perfluoro surfactant or silicon surfactant to the IPA or the like.

According to the production method of the present invention, the three-dimensional structures of the pulverized products in the porous body precursor are immobilized, for example. In the case of conventional immobilization by sintering, for example, a treatment at a high temperature of at least 200° C. is performed to induce the dehydration condensation of silanol groups and the formation of siloxane bonds. In the present invention, various additives that catalyze the above-described dehydration condensation reaction are caused to react with each other. With this configuration, for example, when the base is a resin film, it is possible to continuously form and immobilize the void-containing structure at a relatively low drying temperature of around 100° C. and with a short treatment time of less than several minutes without damaging the base.

The method for achieving the above-described chemical bonding is not particularly limited, and can be determined as appropriate depending on the type of the gelled silicon compound, for example. As a specific example, the chemical bonding can be achieved by chemically crosslinking the pulverized products. Besides this, for example, when inorganic particles such as titanium oxide particles are added to the pulverized products, the inorganic particles and the pulverized products may be chemically bonded by crosslinking. Furthermore, in the case of causing the pulverized products to carry a biocatalyst such as an enzyme, a site of the catalyst other than the catalytic site may be chemically crosslinked with the pulverized products. Therefore, the present invention is not only applicable to a void-containing layer (silicone porous body) formed by sol particles bonded to each other, but the applicable range of the present invention can be expanded to an organic-inorganic hybrid void-containing layer and a host-guest void-containing layer, for example. It is to be noted, however, that the applicable range of the present invention is not limited thereto.

Depending on the type of the pulverized product of the gelled compound, the bonding can be achieved by causing a chemical reaction to chemically bond the pulverized products (microporous particles) to each other in the presence of a catalyst, for example. The catalyst may be a catalyst that promotes crosslinking of the microporous particles, for example. The chemical reaction in the present invention preferably is a reaction utilizing a dehydration condensation reaction of residual silanol groups contained in silica sol molecules. By promoting the reaction between the hydroxyl groups in the silanol groups by the catalyst, the void-containing structure can be cured in a short time, so that continuous film formation becomes possible. Examples of the catalyst include, but are not limited to, base catalysts such as potassium hydroxide, sodium hydroxide, and ammonium hydroxide and acid catalysts such as a hydrochloric acid, an acetic acid, and an oxalic acid. As a catalyst to be used in the dehydration condensation reaction, a base catalyst is particularly preferable. Also, catalysts that exhibit catalytic activity when irradiated with light (e.g., ultraviolet rays), such as photoacid generation catalysts, photobase generation catalysts, photoacid generators, and photobase generators can be used preferably. The photoacid generation catalysts, photobase generation catalysts, photoacid generators, and photobase generators are not particularly limited, and are as described above, for example. For example, the catalyst can be added to the microporous particle-containing solution (e.g., suspension of the pulverized products [microporous particles]) in the step of preparing the microporous particle-containing solution, as described above. More specifically, it is preferable to add the catalyst to a sol particle solution (e.g., suspension) containing the pulverized products (microporous particles) immediately before coating the sol particle solution, or to use the catalyst in the form of a mixture with a solvent, for example. The mixture may be, for example, a coating solution obtained by adding the catalyst directly to and dissolving the catalyst in the sol particle solution, a solution obtained by dissolving the catalyst in a solvent, or a dispersion obtained by dispersing the catalyst in a solvent. The solvent is not particularly limited, and examples thereof include water and buffer solutions, as described above.

The timing at which the chemical reaction in the presence of the catalyst is caused (occurs) in the production method of the present invention is not particularly limited. The chemical reaction can be caused by, for example: subjecting the coating film containing the catalyst previously added to the sol particle solution (e.g., suspension) to heating or light irradiation; subjecting the coating film to heating or light irradiation after spraying the catalyst over the coating film; or subjecting the coating film to heating or light irradiation while spraying the catalyst over the coating film. For example, when the catalyst is a photoactive catalyst, the low refractive index layer can be formed by chemically bonding the microporous particles to each other by light irradiation. When the catalyst is a thermoactive catalyst, the low refractive index layer can be formed by chemically bonding the microporous particles to each other by heating. The accumulated amount of light in the above irradiation is not particularly limited, and is, for example, from 200 to 800 mJ/cm$^2$, from 250 to 600 mJ/cm$^2$, or from 300 to 400 mJ/cm$^2$, in terms of light at a wavelength of 360 nm. The accumulated amount of light preferably is 200 mJ/cm$^2$ or more, from the viewpoint of preventing the problem in that, owing to insufficient irradiation dose, degradation of the catalyst generator by light absorption may not proceed sufficiently, so that the catalyst generator cannot exhibit its effect sufficiently. The accumulated amount of light preferably is 800 mJ/cm$^2$ or less, from the viewpoint of preventing damage to the base disposed under the void-containing layer so as to prevent the formation of heat wrinkles. The conditions for the heat treatment are not particularly limited. The heating temperature is from 50° C. to 250° C., from 60° C. to 150° C., or from 70° C. to 130° C., for example, and the heating time is from 0.1 to 30 minutes, from 0.2 to 10 minutes, or from 0.3 to 3 minutes, for example. The step of drying the sol particle solution (e.g., suspension) also may serve as the step of causing the chemical reaction in the presence of the catalyst. That is, in the step of drying the coated sol particle solution (e.g., suspension), the pulverized products (microporous particles) may be chemically bonded to each other in the presence of the catalyst. In this case, the coating film after the drying step may be heated further to bond the pulverized products (microporous particles) more strongly. Furthermore, it is speculated that the chemical reaction in the presence of the catalyst also may occur in the step of preparing the microporous particle-containing solution (e.g., suspension) and the step of coating the microporous particle-containing solution. It is to be noted, however, that this speculation does not limit the present invention by any means. It is preferable to use, for example, a solvent having a low surface tension for the purpose of inhibiting the shrinkage stress that may occur as the solvent volatizes during the drying process and inhibiting a crack phenomenon in the void-containing layer caused by the shrinkage stress. Examples of the solvent include, but are not limited to, lower alcohols (typically, isopropyl alcohol [IPA]), hexane, and perfluorohexane.

The low refractive index layer in the form of a void-containing layer containing hollow particles, laminated film, or laminated film roll according to the present invention can be produced in the above-described manner. However, the production method of the present invention is not limited thereto.

The obtained low refractive index layer, laminated film, or laminated film roll of the present invention may be subjected to a strength improving step of improving the strength (this step also may be referred to as an "aging step" hereinafter) through thermal aging or the like, for example. For example, when the low refractive index layer of the present invention is laminated on a resin film, the peel adhesion strength on the resin film can be improved by the strength improving step (aging step). In the strength improving step (aging step), the low refractive index layer of the present invention may be heated, for example. The temperature of the aging step is from 40° C. to 80° C., from 50° C. to 70° C., or from 55° C. to 65° C., for example. The reaction time is from 5 to 30 hours, from 7 to 25 hours, or from 10 to 20 hours, for example. By setting the heating temperature low in the aging step, for example, the peel adhesion strength can be improved while inhibiting the shrinkage of the low refractive index layer, so that the low refractive index layer can attain both a high void fraction and a high strength.

Although the phenomenon occurring in the strength improving step (aging step) and the mechanism thereof are unknown, it is considered that, for example, the catalyst contained in the low refractive index layer of the present invention causes the chemical bonding (e.g., a crosslinking reaction) of the microporous particles to further proceed, thereby improving the strength. As a specific example, when the microporous particles are microporous particles of a silicon compound (e.g., pulverized products of a gelled silica compound) and residual silanol groups (OH groups) are present in the low refractive index layer, it is considered that the residual silanol groups are chemically bonded to each other through a crosslinking reaction. The catalyst contained in the low refractive index layer of the present invention is not particularly limited, and may be, for example, a catalyst used in the bonding step, a basic substance generated by a photobase generation catalyst used in the bonding step when the photobase generation catalyst is subjected to light irradiation, or an acidic substance generated by a photoacid generation catalyst used in the bonding step when the photoacid generation catalyst is subjected to light irradiation. It is to be noted, however, that this explanation is merely illustrative and does not limit the present invention.

A pressure-sensitive adhesive/adhesive layer further may be formed on the low refractive index layer of the present invention (the pressure-sensitive adhesive/adhesive layer forming step). Specifically, the pressure-sensitive adhesive/adhesive layer may be formed by applying (coating) a pressure-sensitive adhesive or an adhesive to the low refractive index layer of the present invention, for example. Alternatively, the pressure-sensitive adhesive/adhesive layer may be formed on the low refractive index layer of the present invention by adhering, e.g., an adhesive tape including a base and the pressure-sensitive adhesive/adhesive layer laminated on the base to the low refractive index layer with the pressure-sensitive adhesive/adhesive layer side of the adhesive tape facing the low refractive index layer. In this case, the base of the adhesive tape may be left on the adhesive tape or may be peeled off from the pressure-sensitive adhesive/adhesive layer. In the present invention, the terms "pressure-sensitive adhesive" and "pressure-sensitive adhesive layer" respectively refer to an agent and a layer that adhere a substance in a peelable manner, for example. In the present invention, the terms "adhesive" and "adhesive layer" respectively refer to an agent and a layer that adhere a substance in a non-peelable manner, for example. It is to be noted, however, that, in the present invention, the "pressure-sensitive adhesive" and the "adhesive" are not always clearly distinguishable from each other, and also, the "pressure-sensitive adhesive layer" and the "adhesive layer" are not always clearly distinguishable from each other. In the present invention, a pressure-sensitive adhesive or an adhesive for forming the pressure-sensitive adhesive/adhesive layer is not particularly limited, and a commonly used pressure-sensitive adhesive or adhesive can be used, for example. Examples of the pressure-sensitive adhesive and the adhesive include: polymer adhesives such as acrylic adhesives, vinyl alcohol adhesives, silicone adhesives, polyester adhesives, polyurethane adhesives, and polyether adhesives; and rubber adhesives. Further, the pressure-sensitive adhesive and the adhesive may be an adhesive composed of a water-soluble crosslinking agent of a vinyl alcohol polymer such as glutaraldehyde, melamine, or an oxalic acid. Only one type of pressure-sensitive adhesive or adhesive may be used, or two or more types of pressure-sensitive adhesives or adhesives may be used in combination (e.g., they may be mixed together or may be laminated). The thickness of the pressure-sensitive adhesive/adhesive layer is not particularly limited, and is, for example, from 0.1 to 100 μm, from 5 to 50 μm, from 10 to 30 μm, or from 12 to 25 μm.

Further, an intermediate layer may be formed between the low refractive index layer of the present invention and the pressure-sensitive adhesive/adhesive layer by causing the low refractive index layer of the present invention to react with the pressure-sensitive adhesive/adhesive layer (an intermediate layer forming step). The intermediate layer allows the low refractive index layer of the present invention to be less liable to be peeled off from the pressure-sensitive adhesive/adhesive layer, for example. Although the reason (mechanism) for this is unknown, it is speculated that the above effect is brought about by the anchoring property (anchor effect) of the intermediate layer, for example. The anchoring property (anchor effect) is a phenomenon (effect) that the interface between the void-containing layer and the intermediate layer is fixed firmly because the intermediate layer is entangled in the void-containing layer in the vicinity of the interface. It is to be noted, however, that the above-described reason (mechanism) merely is an example of the reason (mechanism) based on speculation and does not limit the present invention by any means. The reaction between the low refractive index layer of the present invention and the pressure-sensitive adhesive/adhesive layer is not particularly limited, and may be a reaction caused by a catalyst, for example. The catalyst may be a catalyst contained in the low refractive index layer of the present invention, for example. Specifically, the catalyst may be, for example, a catalyst used in the bonding step, a basic substance generated by a photobase generation catalyst used in the bonding step when the photobase generation catalyst is subjected to light irradiation, or an acidic substance generated by a photoacid generation catalyst used in the bonding step when the photoacid generation catalyst is subjected to light irradiation. The reaction between the low refractive index layer of the present invention and the pressure-sensitive adhesive/adhesive layer may be, for example, a reaction (e.g., a crosslinking reaction) that newly generates chemical bonds. The reaction temperature is, for example, from 40° C. to 80° C., from 50° C. to 70° C., or from 55° C. to 65° C. The reaction time is, for example, from 5 to 30 hours, from 7 to 25 hours, or from 10 to 20 hours. This intermediate layer forming step may also serve as the strength improving step (aging step) of improving the strength of the low refractive index layer of the present invention.

The low refractive index layer of the present invention obtained in this manner may be further laminated on another film (layer) to form a laminated structure including the porous structure, for example. In this case, the respective components of the laminated structure may be laminated via a pressure-sensitive adhesive or an adhesive, for example.

The respective components may be laminated by continuous processing using a long film (e.g., the so-called "roll-to-roll" process) in terms of efficiency, for example. When the base is a molded product, an element, or the like, the components that have been subjected to batch processing may be laminated on the base.

Figure 2:
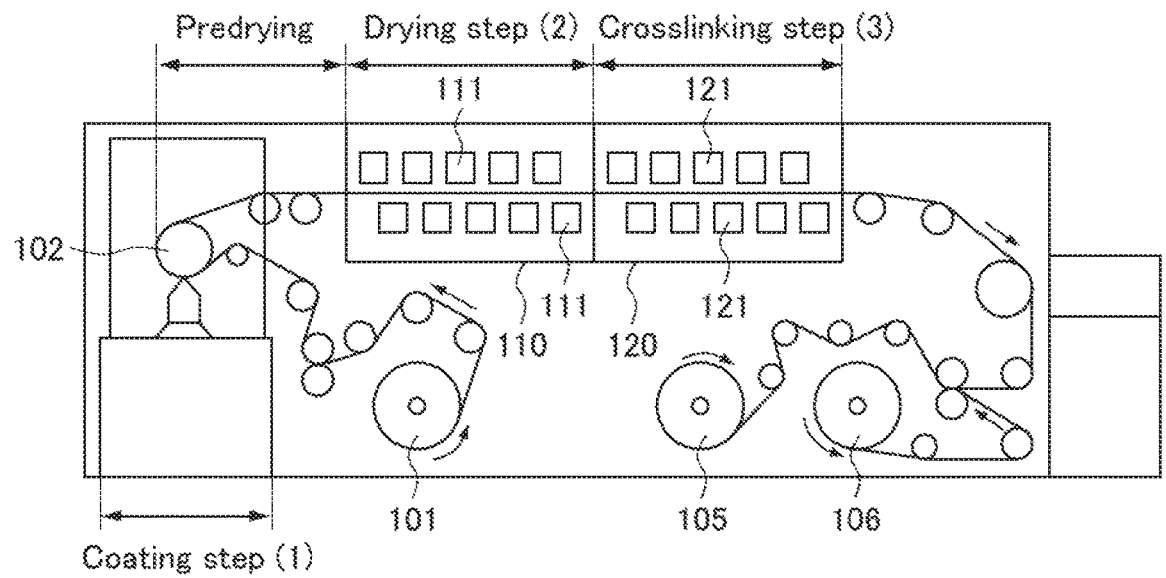
FIG. 2 is a schematic view showing an example of some steps in a method for producing the laminated film according to the present invention in the form of a roll (may be referred to as the "laminated film roll of the present invention" hereinafter) and an apparatus used in the method.
Figure 3:
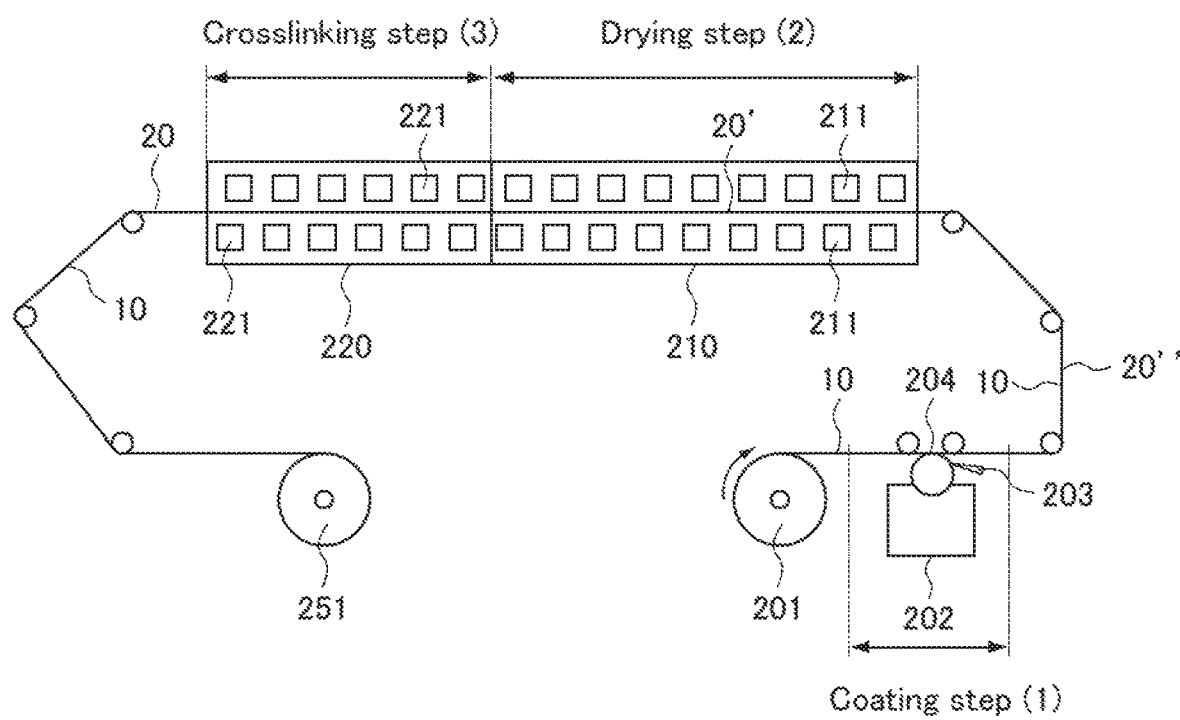
FIG. 3 is a schematic view showing another example of some steps in a method for producing the laminated film roll of the present invention and an apparatus used in the method.

Regarding the method for forming the low refractive index layer of the present invention on a base, continuous processing steps will be described below with reference to illustrative examples shown in FIGS. 1 to 3. FIG. 2 shows, after the film formation of a silicone porous body (low refractive index layer), the steps of attaching a protective film to the thus-formed film and winding up the thus-obtained laminate. However, in the case where the silicone porous body is laminated on another functional film, this may be achieved in the above-described manner, or alternatively, in the following manner: after performing coating and drying for forming the functional film, the silicone porous body formed into a film (low refractive index layer) is adhered to the functional film immediately before being wound-up. It should be noted that the film forming processes shown in FIGS. 1 to 3 are merely illustrative and do not limit the present invention by any means.

The base may be the resin film described above in connection with the low refractive index layer of the present invention. In this case, the low refractive index layer of the present invention is obtained by forming the low refractive index layer on the base. The low refractive index layer of the present invention also is obtained by forming the low refractive index layer on the base and then laminating the low refractive index layer on the resin film described above in connection with the low refractive index layer of the present invention.

FIG. 1 is a sectional view schematically showing an example of steps included in the method for forming a low refractive index layer on a base. In FIG. 1, the method for forming a low refractive index layer includes: a coating step (1) of coating a sol particle solution 20" containing pulverized products of a gelled compound onto a base 10; a coating film forming step (drying step) (2) of drying the sol particle solution 20" to form a coating film 20', which is a precursor layer of a low refractive index layer; and a chemical treatment step (e.g., crosslinking treatment step) (3) of subjecting the coating film 20' to a chemical treatment (e.g., crosslinking treatment) to form a low refractive index layer 20. As shown in FIG. 1, the sol particle solution 20" contains hollow particles 25, and the hollow particles 25 each have a void space 26 inside. Thus, the coating film 20' and the low refractive index layer 20 formed using the sol particle solution 20" also contain the hollow particles 25. In the above-described manner, as shown in FIG. 1, the low refractive index layer 20 can be formed on the base 10. The low refractive index layer 20 is formed from a void-containing layer, and the void-containing layer contains the hollow particles 25. The chemical treatment step (e.g., crosslinking treatment step) (3) is optional, and may or may not be performed. In other words, the method for forming the low refractive index layer may include the coating step (1) and the coating film forming step (drying step) (2) only, for example. The method for forming the low refractive index layer may include any step other than the steps (1) to (3) as appropriate, or may not include any step other than the steps (1) to (3).

In the coating step (1), the method for coating the sol particle solution 20" is not particularly limited, and a commonly used coating method can be employed. Examples of the coating method include a slot die method, a reverse gravure coating method, a micro-gravure method (micro-gravure coating method), a dip method (dip coating method), a spin coating method, a brush coating method, a roller coating method, a flexography, a wire-bar coating method, a spray coating method, an extrusion coating method, a curtain coating method, and a reverse coating method. Among them, from the viewpoint of productivity, smoothness of a coating film, etc., the extrusion coating method, the curtain coating method, the roller coating method, and the micro-gravure coating method are preferable. The coating amount of the sol particle solution 20" is not particularly limited, and can be set as appropriate so that the low refractive index layer 20 having a suitable thickness is obtained, for example. The thickness of the low refractive index layer 20 is not particularly limited, and is as described above, for example.

In the drying step (2), the sol particle solution 20" is dried (i.e., a dispersion medium contained in the sol particle solution 20" is removed) to form the coating film (precursor layer) 20'. The conditions for the drying treatment are not particularly limited, and may be as described above.

In the chemical treatment step (3), the coating film 20' containing a catalyst (e.g., a photoactive catalyst or a thermoactive catalyst such as KOH) added prior to the coating step is irradiated with light or heated, whereby the pulverized products in the coating film 20' are chemically bonded (e.g., crosslinked) to each other. As a result, the low refractive index layer 20 is formed. The conditions for the light irradiation and heating in the chemical treatment step (3) are not particularly limited, and may be as described above. In the case where the chemical treatment step (3) is not performed, for example, it is not necessary to add the catalyst to the sol particle solution 20'. When the base 10 is a resin film, the low refractive index layer 20 may be laminated directly on the resin film (base 10), for example.

FIG. 2 schematically shows an example of a slot die coating apparatus and the method for forming a low refractive index layer using the same. While FIG. 2 is a sectional view, hatching is omitted for the sake of clarity.

As shown in FIG. 2, the respective steps in the method using this apparatus are performed while conveying a base 10 in one direction by rollers. The conveyance speed is not particularly limited, and is, for example, from 1 to 100 m/min, from 3 to 50 m/min, or from 5 to 30 m/min.

First, while feeding and conveying the base 10 from a delivery roller 101, a coating step (1) of coating a sol particle solution 20" onto the base 10 is performed on a coating roller 102. Subsequently, in an oven zone 110, a drying step (2) is performed. In the coating apparatus shown in FIG. 2, a pre-drying step is performed after the coating step (1) and prior to the drying step (2). The pre-drying step can be performed at room temperature without heating. In the drying step (2), heating units 111 are used. As the heating unit 111, a hot air fan, a heating roll, a far-infrared heater, or the like can be used as appropriate, as described above. Also, for example, the drying step (2) may be divided into two or more steps, and the drying temperatures in the respective steps may be set so that the drying temperature in the first step increases toward the step(s) subsequent thereto.

After the drying step (2), a chemical treatment step (3) is performed in a chemical treatment zone 120. In the chemical treatment step (3), when a coating film 20' after being dried contains a photoactive catalyst, for example, the coating film 20' is irradiated with light emitted from lamps (light irradiation units) 121 disposed above and below the base 10. On the other hand, when the coating film 20' after being dried contains a thermoactive catalyst, for example, hot air fans (heating units) are used instead of the lamps (light irradiation units) 121, and the base 10 is heated using the hot air fans 121 disposed above and below the base 10. By this crosslinking treatment, pulverized products in the coating film 20' are chemically bonded to each other, whereby a low refractive index layer 20 is cured and strengthened. Although the chemical treatment step (3) is performed after the drying step (2) in the present example, the timing at which chemical bonding of the pulverized products is caused in the production method of the present invention is not particularly limited, as described above. For example, as described above, the drying step (2) may also serve as the chemical treatment step (3). Further, even in the case where the chemical bonding has occurred in the drying step (2), the chemical treatment step (3) further may be performed to make the chemical bonds between the pulverized products still stronger. Furthermore, the chemical binding of the pulverized products may occur in the steps (e.g., the pre-drying step, the coating step (1), and a step of preparing the coating solution) prior to the drying step (2). Then, after the chemical treatment step (3), a laminate obtained by forming the low refractive index layer 20 on the base 10 is wound up by a winding roller 105. When the resin film is used as the base 10, the low refractive index layer 20 can be formed directly on the resin film (base 10), for example. In FIG. 2, the low refractive index layer 20 in the laminate is protected by being covered with a protecting sheet fed by a roller 106. Instead of the protecting sheet, another layer formed of a long film may be laminated on the low refractive index layer 20.

FIG. 3 schematically shows an example of a coating apparatus for a micro-gravure method (micro-gravure coating method) and the method for forming a low refractive index layer using the same. While FIG. 3 is a sectional view, hatching is omitted for the sake of clarity.

As shown in FIG. 3, the respective steps in the method using this apparatus are performed while conveying a base 10 in one direction by rollers, as in the example shown in FIG. 2. The conveyance speed is not particularly limited, and is, for example, from 1 to 100 m/min, from 3 to 50 m/min, or from 5 to 30 m/min.

First, while feeding and conveying the base 10 from a delivery roller 201, a coating step (1) of coating a sol particle solution 20" onto the base 10 is performed. As shown in FIG. 3, the sol particle solution 20" is coated using a solution reservoir 202, a doctor (doctor knife) 203, and a micro-gravure coater 204. Specifically, the sol particle solution 20" in the solution reservoir 202 is caused to be carried on the surface of the micro-gravure coater 204, and is then coated on the surface of the base 10 with the micro-gravure coater 204 while controlling the thickness of the coating film of the sol particle solution 20" to a predetermined thickness with the doctor 203. It is to be noted here that the micro-gravure coater 204 merely is an example of a coating unit. The coating unit is not limited to the micro-gravure coater 204, and any coating unit may be employed.

Next, a drying step (2) is performed. Specifically, as shown in FIG. 3, the base 10 having the sol particle solution 20" coated thereon is conveyed to an oven zone 210. The sol particle solution 20" is dried by being heated with heating units 211 disposed in the oven zone 210. The heating units 211 may be the same as those in FIG. 2, for example. The drying step (2) may be divided into a plurality of steps by dividing the oven zone 210 into a plurality of sections, for example. The drying temperatures in the respective steps may be set so that the drying temperature in the first step increases toward the step(s) subsequent thereto. After the drying step (2), a chemical treatment step (3) is performed in a chemical treatment zone 220. In the chemical treatment step (3), when a coating film 20' after being dried contains a photoactive catalyst, for example, the coating film 20' is irradiated with light emitted from lamps (light irradiation units) 221 disposed above and below the base 10. On the other hand, when the coating film 20' after being dried contains a thermoactive catalyst, for example, hot air fans (heating units) are used instead of the lamps (light irradiation units) 221, and the base 10 is heated using the hot air fans 221 disposed below the base 10. By this crosslinking treatment, pulverized products in the coating film 20' are chemically bonded to each other, whereby a low refractive index layer 20 is formed.

Then, after the chemical treatment step (3), a laminate obtained by forming the porous structure 20 on the base 10 is wound up by a winding roller 251. When the resin film is used as the base 10, the low refractive index layer 20 can be formed directly on the resin film (base 10), for example. Thereafter, another layer may be laminated on the laminate, for example. Further, before the laminate is wound up by the winding roller 251, another layer may be laminated on the laminate, for example.

Figure 4:
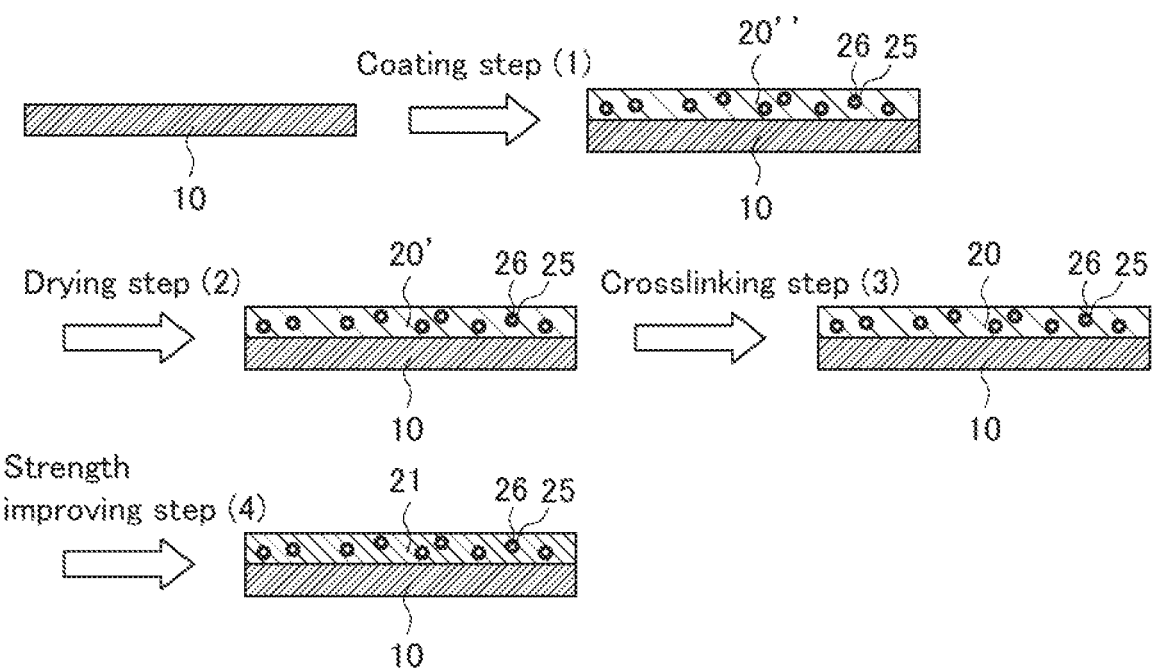
FIG. 4 is a sectional view schematically illustrating another example of the process of the method for forming the low refractive index layer on the base in the present invention.
Figure 5:
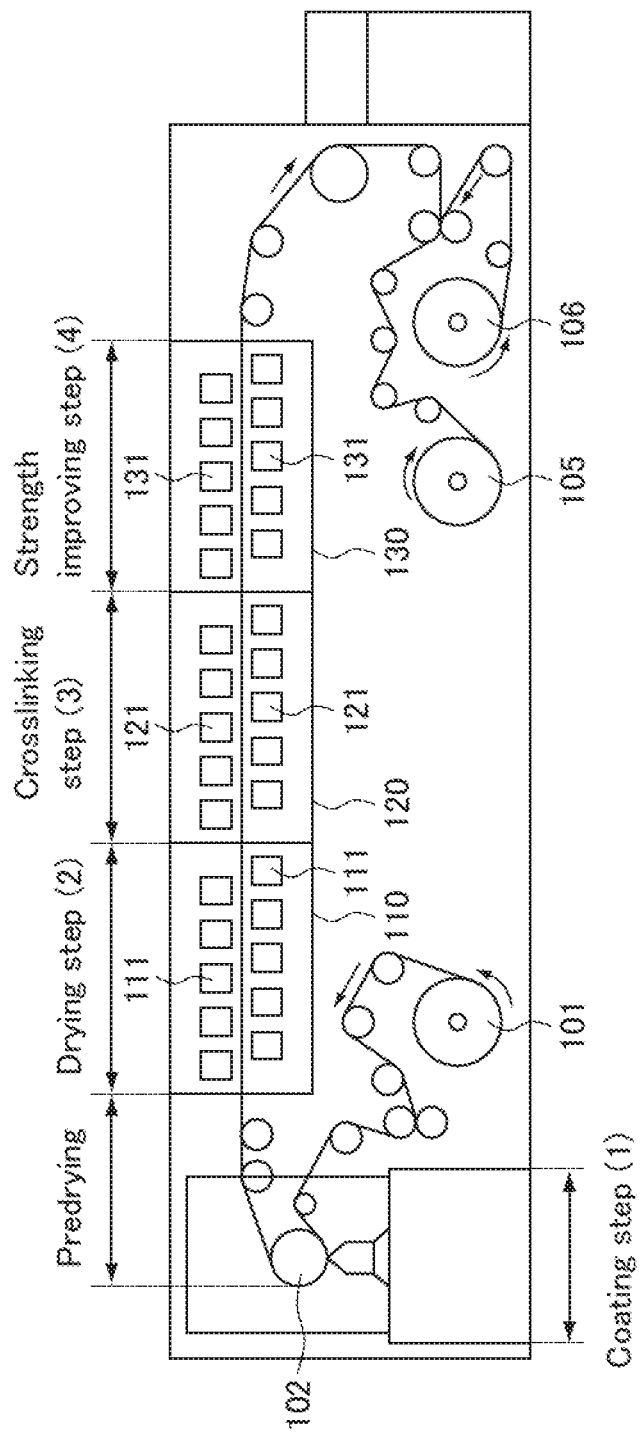
FIG. 5 is a schematic view showing still another example of some steps in a method for producing the low refractive index layer of the present invention and an apparatus used in the method.
Figure 6:
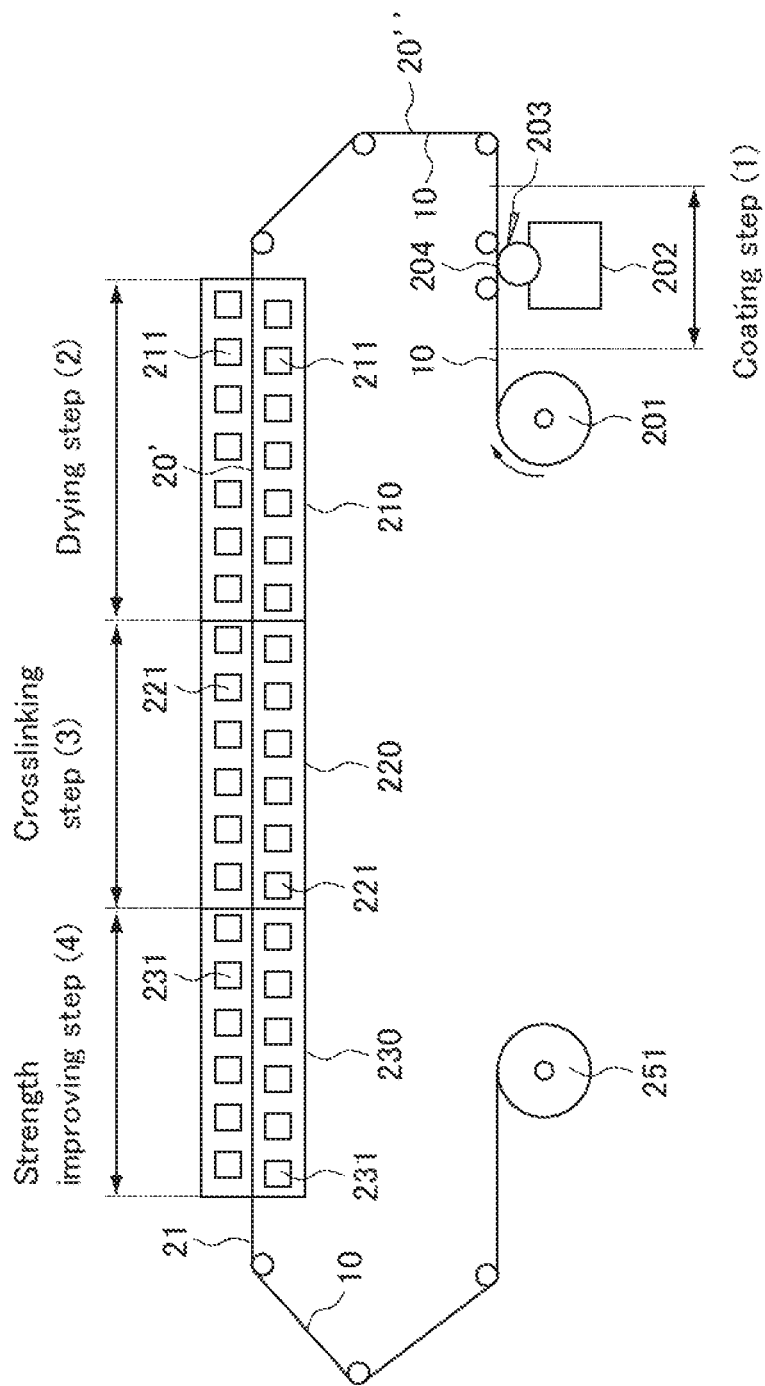
FIG. 6 is a schematic view showing still another example of some steps in the method for producing the low refractive index layer of the present invention and an apparatus used in the method.

FIGS. 4 to 6 show other examples of continuous processing steps in the method for forming the low refractive index layer of the present invention. As can be seen from the sectional view of FIG. 4, the method shown in FIG. 4 is the same as the methods shown in FIGS. 1 to 3, except that a strength improving step (aging step) (4) is performed after a chemical treatment step (e.g., crosslinking treatment step) (3) of forming a low refractive index layer 20. As shown in FIG. 4, in the strength improving step (aging step) (4), the strength of the low refractive index layer 20 is improved to provide a low refractive index layer 21 with an improved strength. The strength improving step (aging step) (4) is not particularly limited, and is as described above, for example.

FIG. 5 is a schematic view showing an example of a slot die coating apparatus and the method for forming a low refractive index layer using the same, which is different from the example shown in FIG. 2. As can be seen from FIG. 5, the coating apparatus shown in FIG. 5 is the same as the coating apparatus shown in FIG. 2, except that it includes, right next to a chemical treatment zone 120 in which a chemical treatment step (3) is performed, a strength improving zone (aging zone) 130 in which the strength improving step (aging step) (4) is performed. That is, after the chemical treatment step (3), the strength improving step (aging step) (4) is performed in the strength improving zone (aging zone) 130 to improve the peel adhesion strength of the low refractive index layer 20 on a resin film 10, thereby forming a low refractive index layer 21 having an improved peel adhesion strength. The strength improving step (aging step) (4) may be performed by heating the low refractive index layer 20 in the same manner as described above using hot air fans (heating units) 131 disposed above and below the base 10, for example. The heating temperature, heating time, etc., are not particularly limited, and are as described above, for example. Thereafter, as in the example shown in FIG. 3, a laminated film obtained by forming the low refractive index layer 21 on the base 10 is wound up by a winding roller 105.

FIG. 6 is a schematic view showing an example of a coating apparatus for a micro-gravure method (micro-gravure coating method) and the method for forming the porous structure using the same, which is different from the example shown in FIG. 3. As can be seen from FIG. 6, the coating apparatus shown in FIG. 6 is the same as the coating apparatus shown in FIG. 3, except that it includes, right next to a chemical treatment zone 220 in which a chemical treatment step (3) is performed, a strength improving zone (aging zone) 230 in which a strength improving step (aging step) (4) is performed. That is, after the chemical treatment step (3), the strength improving step (aging step) (4) is performed in the strength improving zone (aging zone) 130 to improve the peel adhesion strength of the low refractive index layer 20 on a resin film 10, thereby forming a low refractive index layer 21 having an improved peel adhesion strength. The strength improving step (aging step) (4) may be performed by heating the low refractive index layer 20 in the same manner as described above using hot air fans (heating units) 231 disposed above and below the base 10, for example. The heating temperature, heating time, etc., are not particularly limited, and are as described above, for example. Thereafter, as in the example shown in FIG. 3, a laminated film obtained by forming the low refractive index layer 21 on the base 10 is wound up by a winding roller 251.

Figure 7:
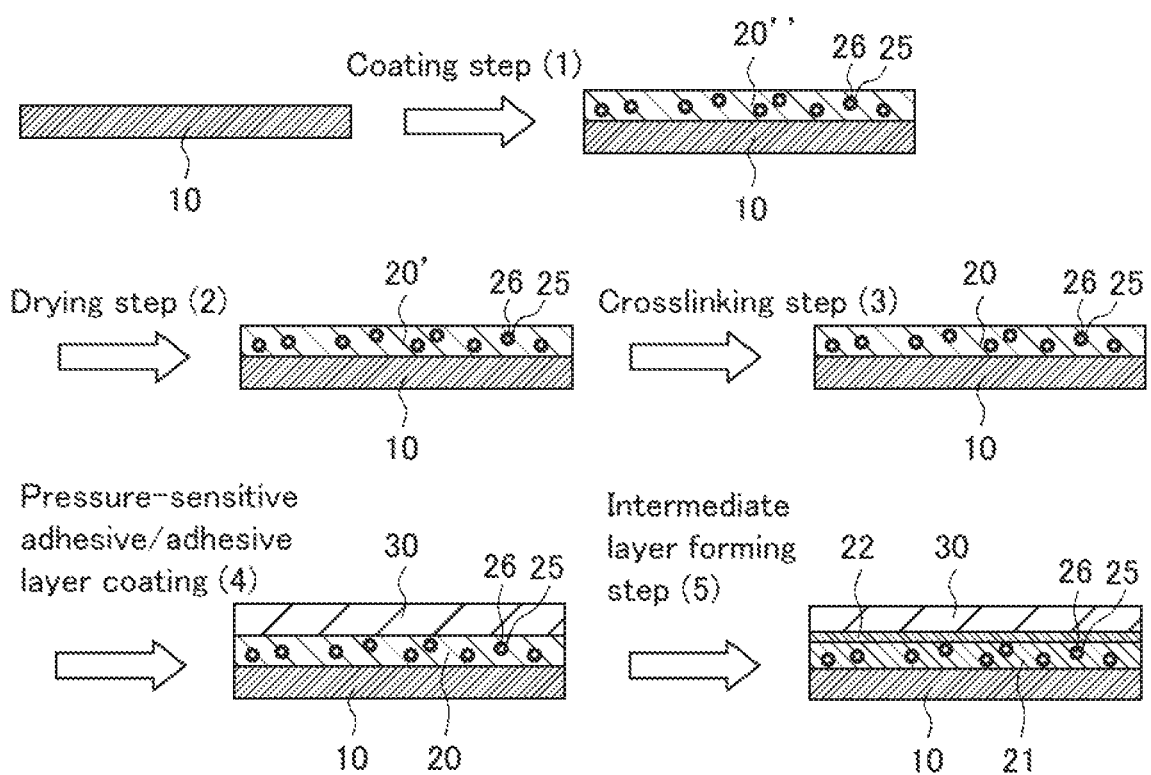
FIG. 7 is a sectional view schematically illustrating still another example of the process of the method for forming the low refractive index layer on the base in the present invention.
Figure 8:
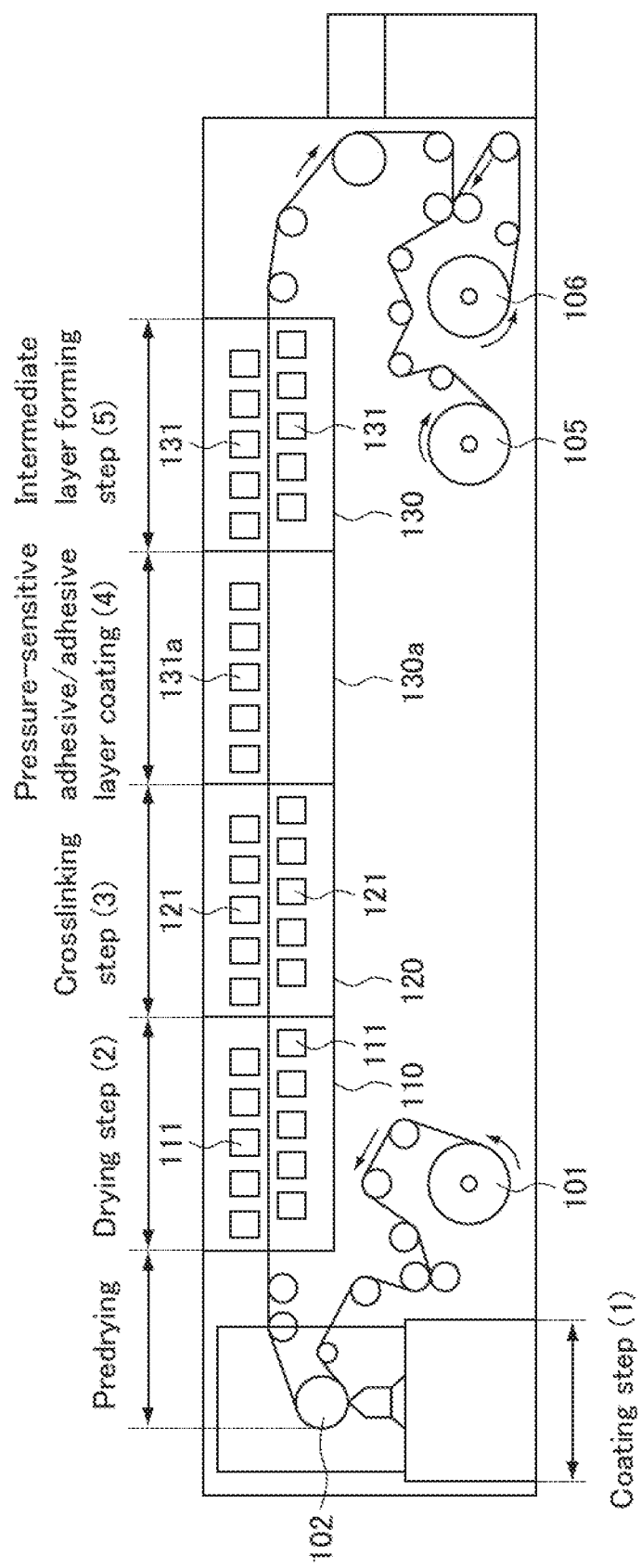
FIG. 8 is a schematic view showing still another example of some steps in the method for producing the low refractive index layer of the present invention and an apparatus used in the method.
Figure 9:
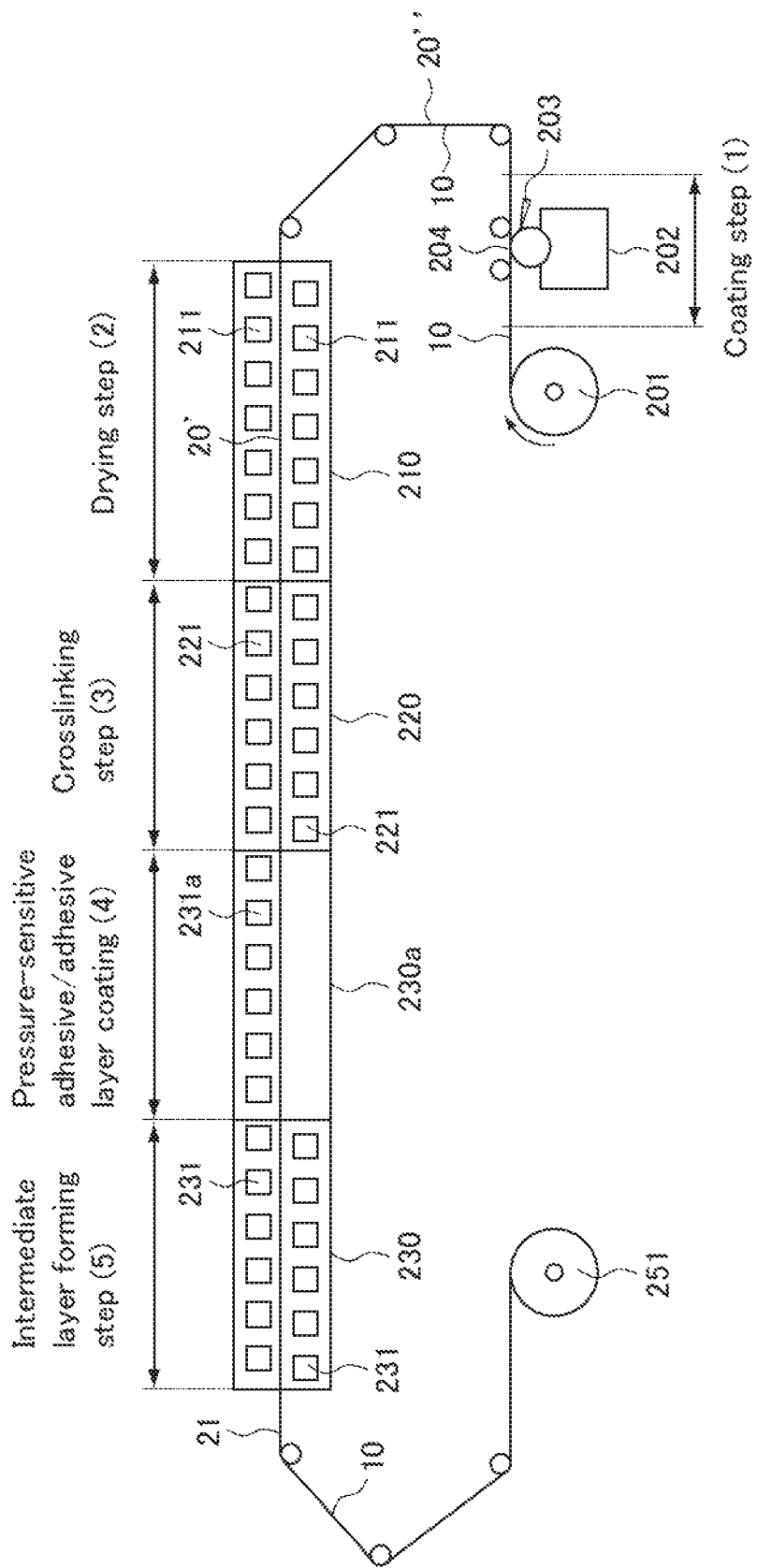
FIG. 9 is a schematic view showing still another example of some steps in the method for producing the low refractive index layer of the present invention and an apparatus used in the method.

FIGS. 7 to 9 show still other examples of continuous processing steps in the method for forming the low refractive index layer of the present invention. As can be seen from the sectional view of FIG. 7, the method shown in FIG. 7 includes, after a chemical treatment step (e.g., crosslinking treatment step) (3) of forming a low refractive index layer 20, a pressure-sensitive adhesive/adhesive layer coating step (pressure-sensitive adhesive/adhesive layer forming step) (4) of coating a pressure-sensitive adhesive/adhesive layer 30 onto the low refractive index layer 20 and an intermediate layer forming step (5) of forming an intermediate layer 22 by causing the low refractive index layer 20 to react with the pressure-sensitive adhesive/adhesive layer 30. Except for the above, the methods shown in FIGS. 7 to 9 are the same as the methods shown in FIGS. 4 to 6, respectively. In FIG. 7, the intermediate layer forming step (5) also serves as a step of improving the strength of the low refractive index layer 20 (strength improving step). Thus, after the intermediate layer forming step (5), the low refractive index layer 20 turns into a low refractive index layer 21 with an improved strength. It is to be noted, however, that the present invention is not limited thereto, and it is not necessary that the low refractive index layer 20 turns into the one with an improved strength after the intermediate layer forming step (5), for example. The pressure-sensitive adhesive/adhesive layer coating step (pressure-sensitive adhesive/adhesive layer forming step) (4) and the intermediate layer forming step (5) are not particularly limited, and are as described above, for example.

FIG. 8 is a schematic view showing still another example of a slot die coating apparatus and the method for forming a low refractive index layer using the same. As can be seen from FIG. 8, the coating apparatus shown in FIG. 8 is the same as the apparatus shown in FIG. 5, except that it includes, right next to a chemical treatment zone 120 in which a chemical treatment step (3) is performed, a pressure-sensitive adhesive/adhesive layer coating zone 130*a* in which a pressure-sensitive adhesive/adhesive layer coating step (4) is performed. In FIG. 8, in an intermediate layer forming zone (aging zone) 130 provided right next to the pressure-sensitive adhesive/adhesive layer coating zone 130*a*, a heat treatment can be performed using hot air fans (heating units) 131 disposed above and below the base 10 in the same manner as the heat treatment performed in the strength improving zone (aging zone) 130 in FIG. 5. That is, in the apparatus shown in FIG. 8, after the chemical treatment step (3), the pressure-sensitive adhesive/adhesive layer coating step (pressure-sensitive adhesive/adhesive layer forming step) (4) of applying (coating) a pressure-sensitive adhesive or an adhesive to a low refractive index layer 20 to form a pressure-sensitive adhesive/adhesive layer 30 is performed in the pressure-sensitive adhesive/adhesive layer coating zone 130*a* using pressure-sensitive adhesive/adhesive layer coating units 131*a*. As described above, instead of applying (coating) the pressure-sensitive adhesive or the adhesive, an adhesive tape including the pressure-sensitive adhesive/adhesive layer 30 may be adhered (attached) to the low refractive index layer 20, for example. Further, an intermediate layer forming step (aging step) (5) is performed in the intermediate layer forming zone (aging zone) 130 to form an intermediate layer 22 by causing the low refractive index layer 20 to react with the pressure-sensitive adhesive/adhesive layer 30. In this step, the low refractive index layer 20 turns into a low refractive index layer 21 with an improved strength, as described above. The heating temperature, heating time, etc. of the heating by the hot air fans (heating units) 131 are not particularly limited, and are as described above, for example.

FIG. 9 is a schematic view showing still another example of a coating apparatus for a micro-gravure method (micro-gravure coating) and the method for forming a porous structure using the same. As can be seen from FIG. 9, the coating apparatus shown in FIG. 9 is the same as the apparatus shown in FIG. 6, except that it includes, right next to a chemical treatment zone 220 in which the chemical treatment step (3) is performed, a pressure-sensitive adhesive/adhesive layer coating zone 230*a* in which a pressure-sensitive adhesive/adhesive layer coating step (4) is performed. In FIG. 9, in an intermediate layer forming zone (aging zone) 230 provided right next to the pressure-sensitive adhesive/adhesive layer coating zone 230*a*, a heat treatment can be performed using hot air fans (heating units) 231 disposed above and below the base 10 in the same manner as the heat treatment performed in the strength improving zone (aging zone) 230 in FIG. 6. That is, in the apparatus shown in FIG. 9, after the chemical treatment step (3), the pressure-sensitive adhesive/adhesive layer coating step (pressure-sensitive adhesive/adhesive layer forming step) (4) of applying (coating) a pressure-sensitive adhesive or an adhesive to the low refractive index layer 20 to form a pressure-sensitive adhesive/adhesive layer 30 is performed in the pressure-sensitive adhesive/adhesive layer coating zone 230*a* using pressure-sensitive adhesive/adhesive layer coating units 231*a*. As described above, instead of applying (coating) the pressure-sensitive adhesive or the adhesive, an adhesive tape including the pressure-sensitive adhesive/adhesive layer 30 may be adhered (attached) to the low refractive index layer 20, for example. Further, an intermediate layer forming step (aging step) (5) is performed in the intermediate layer forming zone (aging zone) 230 to form an intermediate layer 22 by causing the low refractive index layer 20 to react with the pressure-sensitive adhesive/adhesive layer 30. In this step, the low refractive index layer 20 turns into a low refractive index layer 21 with an improved strength, as described above. The heating temperature, heating time, etc. of the heating by the hot air fans (heating units) 231 are not particularly limited, and are as described above, for example.

[3. Optical Element]

As described above, the optical element of the present invention includes the low refractive index layer or laminated film of the present invention. The optical element of the present invention is characterized in that it includes the low refractive index layer or laminated film of the present invention, and other configurations are by no means limited. The optical element of the present invention may further include any layer(s) other than the low refractive index layer or laminated film of the present invention, for example.

The optical element of the present invention may include the low refractive index layer or laminated film of the present invention as a low reflection layer. Other configurations are by no means limited. The optical element of the present invention may further include any layer(s) other than the low refractive index layer or laminated film of the present invention, for example. The optical element of the present invention is in the form of a roll, for example.

EXAMPLES

Examples of the present invention will be described below. It is to be noted, however, that the present invention is by no means limited to the following examples.

Reference Example 1: Preparation of Sol Solution (1) Gelation of Silicon Compound 0.95 g of a silicon compound precursor MTMS was dissolved in 2.2 g of DMSO. To the resultant mixture, 0.5 g of 0.01 mol/L oxalic acid aqueous solution was added. The resultant mixture was stirred at room temperature for 30 minutes, whereby MTMS was hydrolyzed to generate tris(hydroxy)methylsilane.

0.38 g of ammonia water with an ammonia concentration of 28% and 0.2 g of pure water were added to 5.5 g of DMSO. Thereafter, the above-described mixture that had been subjected to the hydrolysis treatment was further added thereto. The resultant mixture was stirred at room temperature for 15 minutes to cause gelation of tris(hydroxy)methylsilane. Thus, a gelled silicon compound was obtained.

(2) Aging Treatment

The mixture that had been subjected to the above gelation treatment was subjected to an aging treatment as it is. The aging treatment was performed by incubating the mixture at 40° C. for 20 hours.

(3) Pulverization Treatment

Subsequently, the gelled silicon compound that had been subjected to the aging treatment was granulated into pieces of several millimeters to several centimeters using a spatula. 40 g of IPA was added thereto, and the resultant mixture was stirred slightly. The mixture was then allowed to stand still at room temperature for 6 hours, and the solvent and the catalyst in the gel were removed by decantation. This decantation treatment was repeated to a total of three times to complete solvent replacement. Then, the gelled silicon compound in the mixture was subjected to a pulverization treatment (high pressure media-less pulverization). The pulverization treatment (high pressure media-less pulverization) was performed in the following manner using a homogenizer (trade name: UH-50, manufactured by SMT Corporation). That is, 1.85 g of the gelled compound after the completion of the solvent replacement and 1.15 g of IPA were weighted and supplied to a 5 cc screw cap bottle, and then pulverized for 2 minutes at 50 W and 20 kHz.

By pulverizing the gelled silicon compound in the mixture through the above-described pulverizing treatment, the mixture turned into a sol solution containing the pulverized products. The volume average particle size, which indicates variations in particle size of the pulverized products contained in the mixture, was measured by a dynamic light scattering Nanotrac particle size analyzer (type: UPA-EX150, manufactured by NIKKISO CO., LTD.). As a result, it was found that the volume average particle size was from 0.50 to 0.70.

Example 1

A laminated film roll including the low refractive index layer of the present invention laminated on a long base (resin film) was produced in the following manner. First, hollow silica nanoparticles (trade name: THRULYA, manufactured by Nissan Chemical Industries, Ltd.) were added to the sol solution obtained in Reference Example 1 at a ratio of 0.028 g of the hollow silica nanoparticles to 0.75 g of the sol solution. Thus, a coating solution was obtained. Then, the coating solution was applied (coated) to a surface of a resin film (length: 100 m) made of polyethylene terephthalate (PET) by bar coating to form a coating film. At this time, the coating film had a wet thickness (thickness before being dried) of about 27 μm. The coating film was dried at 100° C. for 1 minute. In this manner, the laminated film of the present invention including the low refractive index layer of the present invention formed on the base (the PET resin film) was obtained.

Example 2

A laminated film was obtained in the same manner as in Example 1, except that the amount of hollow silica nanoparticles to be added was set to the following ratio: 0.056 g of the hollow silica nanoparticles to 0.75 g of the sol solution obtained in Reference Example 1.

Example 3

A coating solution was obtained by adding, in addition to hollow silica nanoparticles, respective components to the sol solution obtained in Reference Example 1 at the following ratio: with respect to 0.75 g of the sol solution, 0.056 g of the hollow silica nanoparticles, 0.062 g of 1.5% solution of a photobase generator (trade name: WPBG266, manufactured by Wako Pure Chemical Industries, Ltd.) in MEK (methyl ethyl ketone), and 0.036 g of 5% solution of bis(trimethoxysilyl)ethane in MEK. This coating solution were coated and dried in the same manner as in Example 1 or 2. Further, the dried coating film was subjected to UV irradiation using light at a wavelength of 360 nm with an irradiation dose (energy) of 300 mJ/cm². In this manner, the laminated film of the present invention including the low refractive index layer of the present invention formed on the base (the PET resin film) was obtained.

Example 4

A coating solution was prepared by mixing of hollow nanoparticles (trade name: THRULYA, manufactured by Nissan Chemical Industries, Ltd.) with an acicular silica sol solution (trade name: "IPA-ST-UP 3%", manufactured by Nissan Chemical Industries, Ltd.) at a ratio of 0.056 g of the hollow nanoparticles to 0.75 g of the acicular silica sol solution. A laminated film of the present invention was obtained in the same manner as in Example 1, except that this coating solution was used instead of the coating solution of Example 1.

Comparative Example 1

A laminated film was obtained in the same manner as in Example 3, except that the hollow nanop articles were not added.

Comparative Example 2

A laminated film was obtained in the same manner as in Example 1, except that the hollow nanop articles were not added.

Comparative Example 3

An attempt was made to increase the thickness of a low refractive index layer by increasing the wet thickness of a coating film without adding hollow particles. Specifically, a laminated film was produced in the same manner as in Example 1, except that the hollow nanoparticles were not added and the wet thickness of the coating film was set to about 40 μm. As a result, cracks occurred when the coating film was dried, and a layer obtained after the drying did not function as a low refractive index layer.

Comparative Example 4

An attempt was made to increase the thickness of a low refractive index layer by increasing the concentration of a coating solution without adding hollow particles. Specifically, a pulverization treatment was carried out in the same manner in Reference Example 1, except that the amount of IPA to be added was set to 0.1 g relative to 1.85 g of the gel. As a result, the pulverization treatment could not be performed successfully because the concentration of the gel was too high. Thus, a sol solution (coating solution) could not be obtained.

Comparative Example 5

A laminated film was obtained in the same manner as in Example 4, except that the hollow nanop articles were not added.

Regarding each of the laminated films of Examples 1 to 4 and Comparative Examples 1, 2, and 5, the refractive index and the anchoring force (the peel adhesion strength on the PET film base) of the low refractive index layer were measured by the methods described above. Also, the thickness of the low refractive index layer included in each of the laminated films was measured. Thereafter, a pressure-sensitive adhesive application endurance test was carried out in the following manner. The results obtained are shown in Table 1 below, together with the results obtained regarding the laminated films of Comparative Examples 3 and 4.

(Pressure-Sensitive Adhesive Application Endurance Test)

A sample was prepared from each of the laminated films of Examples 1 to 4 and Comparative Examples 1, 2, and 5 by applying a pressure-sensitive adhesive layer (thickness: 12 μm) to the low refractive index layer-side of the laminate and then subjecting the laminate to an aging treatment at 60° C. for 20 hours. Thereafter, the sample was placed in an oven set at 80° C. 100 hours later, whether void spaces remained in the low refractive index layer was checked by observing a cross section of the sample under a SEM.

TABLE 1

| | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|
| Refractive index | 1.11 | 1.12 | 1.17 | 1.19 | 1.17 | 1.12 | (1) | (2) | 1.171 |
| Anchoring force (Peel adhesion strength) | 0.4 N/ 25 mm | 0.3 N/ 25 mm | 1.9 N/ 25 mm | 1.2 N/ 25 mm | 1.8 N/ 25 mm | 0.2 N/ 25 mm | | | 1.0 N/ 25 mm |
| Thickness of low refractive index layer | 1550 nm | 1600 nm | 1300 nm | 1200 nm | 600 nm | 550 nm | | | 570 nm |
| Presence or absence of void structure after pressure-sensitive adhesive application endurance test (80° C. and 100 hr) | ○ Void structure remained. | ○ Void structure remained. | ○ Void structure remained. | ○ Void structure remained. | x All the void spaces were filled. | x All the void spaces were filled. | | | x All the void spaces were filled. |

(1) A low refractive index layer could not be obtained owing to the occurrence of cracks at the time of drying.
(2) The viscosity of the gel was too high, so that a sol solution (coating solution) could not be prepared and thus a low refractive index layer could not be obtained.

As can be seen from Table 1, in the laminated films according to the examples containing the hollow particles, the thicknesses of the low refractive index layers were much larger than the thicknesses of the low refractive index layers in the laminated films of the comparative examples, even in the case where there was no difference in wet thickness of the sol solution (coating solution) between the examples and the comparative examples. As a result, in the pressure-sensitive adhesive application endurance test, the laminated films of the examples exhibited more favorable results than the laminated films of the comparative examples. More specifically, while the low refractive index layer of the comparative examples exhibited low refractive indices prior to the pressure-sensitive adhesive application endurance test as shown in Table 1, they could not maintain the low refractive indices after the pressure-sensitive adhesive application endurance test, because all the void spaces were filled with (closed by) the pressure-sensitive adhesive. In contrast, in the low refractive index layer of the examples, the void spaces remained and the low refractive indices could be maintained after the pressure-sensitive adhesive application endurance test. In the low refractive index layer of Example 3 adapted to improve the mechanical strength by enhancing the bonding of the gel using a photocatalyst, while the refractive index was slightly higher than those of the low refractive index layers of Examples 1 and 2, the anchoring force (peel adhesion strength) was improved greatly. The low refractive index layer of Example 4 was formed without using a photocatalyst. However, since the void-containing layer (low refractive index layer) was formed with acicular silica, the bonding of gel was enhanced as compared with that in the low refractive index layers of Examples 1 and 2. Thus, also in the low refractive index layer of Example 4, while the refractive index was slightly higher than those of the low refractive index layers of Examples 1 and 2, the anchoring force (peel adhesion strength) was improved greatly. Further, comparison of the low refractive index layers formed under the same conditions except for the presence or absence of the hollow particles, namely, comparison between the low refractive index layers of Example 3 and Comparative Example 1, between the low refractive index layers of Example 1 and Comparative Example 2, and between the low refractive index layers of Example 4 and Comparative Example 5, demonstrated that the presence of the hollow particles did not cause a loss of the anchoring force (peel adhesion strength). On the contrary, the anchoring force (peel adhesion strength) was improved slightly.

As described above, in Comparative Example 3, an attempt was made to increase the thickness of a low refractive index layer by increasing the wet thickness of the coating film without adding hollow particles. As a result, cracks occurred at the time of drying the coating film, and the layer obtained after the drying did not function as a low refractive index layer. Further, as described above, in Comparative Example 4, an attempt was made to increase the thickness of a low refractive index layer by increasing the concentration of the coating solution without adding hollow particles. As a result, the pulverization treatment could not be performed successfully because the concentration of the gel was too high. Thus, a sol solution (coating solution) itself could not be obtained.

INDUSTRIAL APPLICABILITY

As specifically described above, the low refractive index layer according to the present invention can realize a low refractive index of 1.25 or less, and also can attain both the low refractive index and a high mechanical strength even when it has a large thickness. The low refractive index layer of the present invention can be produced by the low refractive index layer production method of the present invention, for example. The low refractive index layer of the present invention is useful in, for example, an optical element or the like that requires a low refractive index layer. Specifically, the low refractive index layer of the present invention can be used in the laminated film, optical element, and image display device according to the present invention, for example. The use of the present invention is not limited thereto, and the present invention is applicable to a wide variety of uses.

EXPLANATION OF REFERENCE NUMERALS

10: base
20: low refractive index layer
20': coating film (precursor layer)
20": sol particle solution
21: low refractive index layer with improved strength
22: intermediate layer
25: hollow particle
26: void space 30: pressure-sensitive adhesive/adhesive layer
101: delivery roller
102: coating roller
110: oven zone
111: hot air fan (heating unit)
120: chemical treatment zone
121: lamp (light irradiation unit) or hot air fan (heating unit)
130a: pressure-sensitive adhesive/adhesive layer coating zone
130: intermediate layer forming zone
131a: pressure-sensitive adhesive/adhesive layer coating unit
131: hot air fan (heating unit)
105: winding roller
106: roller
201: delivery roller
202: solution reservoir
203: doctor (doctor knife)
204: micro-gravure coater
210: oven zone
211: heating unit
220: chemical treatment zone
221: lamp (light irradiation unit) or hot air fan (heating unit)
230a: pressure-sensitive adhesive/adhesive layer coating zone
230: intermediate layer forming zone
231a: pressure-sensitive adhesive/adhesive layer coating unit
231: hot air fan (heating unit)
251: winding roller

The invention claimed is:

1. A low refractive index layer consisting of hollow particles each having voids inside thereof, wherein the hollow particles have a core-shell structure, a content of the hollow particles in the low refractive index layer is 70 wt % or less, and
aggregation of three-dimensional structures, wherein the three-dimensional structures consist of structural units chemically and directly bonded to each other by a catalyst, and minute void spaces formed between the structural units wherein the structural units consists of microporous particles of a pulverized product of a silica gelled compound, and optionally nanofibers and nanoclays, wherein the microporous particles of the pulverized product of a silica gelled compound have a volume average particle size is 0.1 μm or more and 2.0 μm or less, and
wherein the low refractive index layer forms a monolithic structure having the minute void spaces, and an open cell structure with multiple pore distributions in which the minute void spaces are three-dimensionally interconnected, wherein the low refractive index layer has a refractive index of 1.25 or less, and a void fraction of at least 40%.

2. The low refractive index layer according to claim 1, wherein each of the hollow particles has a void fraction from 10 to 95 vol %.

3. The low refractive index layer according to claim 1, wherein the hollow particles have a volume average particle size in a range from 10 to 500 nm.

4. The low refractive index layer according to claim 1, wherein an abrasion resistance of the low refractive index layer defined by a residual ratio of Si before and after a sliding test is from 60% to 100%, and a folding endurance of the low refractive index layer measured by an MIT test and indicating a flexibility is 100 times or more.

5. The low refractive index layer according to claim 1, wherein the structural units are bonded to each other through a hydrogen bond or a covalent bond.

6. The low refractive index layer according to claim 1, wherein the microporous particles further includes at least one element selected from the group consisting of Mg, Al, Ti, Zn, and Zr.

7. The low refractive index layer according to claim 1, wherein the minute void spaces has pores with a pore size from 2 to 200 nm.

8. The low refractive index layer according to claim 1, wherein the low refractive index layer has a thickness from 0.01 to 100 μm.

9. The low refractive index layer according to claim 1, wherein a haze value of the low refractive index layer is less than 5%.

10. The low refractive index layer according to claim 1, wherein the low refractive index layer contains an acid or a base that acts to improve a strength of the low refractive index layer when the acid or the base is subjected to at least one of light irradiation or heating.

11. A laminated film comprising: a base; and the low refractive index layer according to claim 1 laminated on the base.

12. The laminated film according to claim 11, in the form of a film roll.

13. An optical element comprising: the laminated film according to claim 11.

14. An image display device comprising: the optical element according to claim 13.

15. An optical element comprising: the low refractive index layer according to claim 1.

16. An image display device comprising: the optical element according to claim 15.

17. The low refractive index layer according to claim 1, wherein the hollow particle having the core-shell structure is a silica hollow nanoparticle or a silica hollow nanoballoon.

* * * * *